US 10,452,155 B2

(12) United States Patent
Yao

(10) Patent No.: US 10,452,155 B2
(45) Date of Patent: Oct. 22, 2019

(54) DISPLAY METHOD OF ON-SCREEN KEYBOARD AND COMPUTER PROGRAM PRODUCT AND NON-TRANSITORY COMPUTER READABLE STORAGE MEDIUM THEREOF

(71) Applicant: Bing-Yang Yao, Taipei (TW)

(72) Inventor: Bing-Yang Yao, Taipei (TW)

( * ) Notice: Subject to any disclaimer, the term of this patent is extended or adjusted under 35 U.S.C. 154(b) by 0 days.

(21) Appl. No.: 15/582,189

(22) Filed: Apr. 28, 2017

(65) Prior Publication Data

US 2017/0315627 A1   Nov. 2, 2017

(30) Foreign Application Priority Data

Apr. 29, 2016  (TW) .............................. 105113621 A

(51) Int. Cl.
*G06F 3/023* (2006.01)
*G06F 3/03* (2006.01)
*G06F 3/0482* (2013.01)

(52) U.S. Cl.
CPC .......... *G06F 3/0236* (2013.01); *G06F 3/0304* (2013.01); *G06F 3/0482* (2013.01); *G06F 2203/04803* (2013.01); *G06F 2203/04804* (2013.01)

(58) Field of Classification Search
CPC .... G06F 3/0236; G06F 3/0482; G06F 3/0304; G06F 2203/04804; G06F 2203/04803
See application file for complete search history.

(56) References Cited

U.S. PATENT DOCUMENTS

| 7,506,259 | B1 * | 3/2009 | Narayanaswami ......................... G06F 9/44505 715/734 |
| 8,928,590 | B1 | 1/2015 | El Dokor |
| 2007/0038731 | A1 * | 2/2007 | Matsunaga ............. G06F 3/038 709/220 |
| 2012/0075192 | A1 * | 3/2012 | Marsden ............. G06F 3/04886 345/168 |
| 2012/0249587 | A1 | 10/2012 | Anderson et al. |
| 2014/0364222 | A1 * | 12/2014 | Tanaka ................ G06F 3/04883 463/31 |

\* cited by examiner

*Primary Examiner* — Shaheda A Abdin

(57) ABSTRACT

A display method of an on-screen keyboard, applied to a computing device connected to a physical keyboard, a screen and a sensor, the physical keyboard including a plurality of keys, and the sensor being configured to detect and obtain an operating position image, where the display method of the on-screen keyboard includes: displaying an on-screen keyboard at a topmost layer of a displayed image of the screen; reading the operating position image obtained by the sensor; converting the operating position image into an operating position data, where the operating position data includes relative position data of a key which is touched or is approached; and according to the operating position data, displaying a first key mark at a position corresponding to the key which is touched or is approached on the on-screen keyboard.

15 Claims, 20 Drawing Sheets

DISPLAY METHOD OF ON-SCREEN KEYBOARD AND COMPUTER PROGRAM PRODUCT AND NON-TRANSITORY COMPUTER READABLE STORAGE MEDIUM THEREOF

CROSS-REFERENCE TO RELATED APPLICATION

This non-provisional application claims priority under 35 U.S.C. § 119(a) to Patent Application No. 105113621 filed in Taiwan, R.O.C. on Apr. 29, 2016, the entire contents of which are hereby incorporated by reference.

BACKGROUND

Technical Field

The present invention relates to a data typing and display method of computing devices such as a computer, a mobile device, or a head-up display/head-mounted display/virtual reality display device, and in particular, to a method for displaying an on-screen keyboard, and a computer program product of the on-screen keyboard.

Related Art

An on-screen virtual keyboard, alternatively referred to as an on-screen keyboard (OSK for short). In Microsoft Windows operating systems, such as Windows 7, Windows 8, and Windows 10, enabling the small screen keyboard is that "a Win key+ an X key" are simultaneously depressed, click on "execute", and then enter "osk"; alternatively, the "on-screen keyboard" is enabled in "start", "all programs", "accessories", and then "ease of access".

Although a physical keyboard may be replaced with the conventional on-screen keyboard to type data, unless a touch-screen on which keys may be clicked by using fingers is used, a data typing speed is extremely slow when keys are clicked one by one by using a mouse. The conventional on-screen keyboard is not suitable to be used in continuously typing a large amount of data. Usually, the conventional on-screen keyboard is used by a user at a last resort. For example, the physical keyboard cannot be normally used for typing due to a fault in a key, or the physical keyboard is an English keyboard, but a French character needs to be typed. Although the user can also enable the conventional on-screen keyboard and type data by using the physical keyboard, it does not make sense due to the conventional on-screen keyboard lacks of the feedback of "a finger standby position" of the user on the physical keyboard in real time. The conventional on-screen keyboard only has the feedback of keystrokes of the user on the physical keyboard in real time.

In prior art I, the American Patent Application No. 2012/0249587 A1 (Inventor: Glen et al.) entitled "KEYBOARD AVATAR FOR HEADS UP DISPLAY (HUD)" discloses a head-up display (HUD) or a head-mounted display (HMD) used for viewing images, of an input device linked to a computer, representing fingers of a user. The HUD and the HMD capture images of the input device and user fingers by using a camera lens and display the images on the HUD and the HMD as shown in FIG. 3A, or after converting the images, the HUD and the HMD display representation images (a finger/hand image 602 and a keyboard image 603) on the HUD and the HMD, as shown in FIG. 3B.

In prior art II, the U.S. Pat. No. 8,928,590 B1 (inventor: Tarek) entitled "GESTURE KEYBOARD METHOD AND APPARATUS" discloses a keyboard capable of capturing operation gestures. The keyboard captures operation gestures of a user within a gesture operation range (that is, a visible range of camera lenses) by using a pair of camera lenses disposed on the keyboard, and is capable of interacting with a system after the gestures are recognized.

The foregoing prior arts do not use or improve the on-screen keyboard (OSK) technology, or use a converted representative image. If a real image is performed with an image processing of translucent effects, a degree of distortion is greatly improved; and this may result in that a finger position in the image is difficult to be identified. If the real image is not performed with the image processing with translucent effects, a wide range of a display screen may be taken up (the real image completely blocks an overlapping image below), and this may result in that the converted representative image may be presented with translucent effects. However, a finger representative image 602 still takes up too much of the display screen, and attention of a user is easily distracted. Moreover, users would feel strange or unexpected when blending of virtual (a VR image or a game image) and reality (an actual keyboard image) together on a display screen. The gesture operating range in the prior art II is at a position about four inches above the keyboard, and an operation gesture is irrelevant to keys of a physical keyboard. Therefore, the prior art II cannot be combined with the OSK technology, cannot help to accelerate the user to type data by using the physical keyboard, and further cannot help the user to train touch typing (typing without using the sense of sight to find the keys). In addition, these prior arts do not disclose how to correct a problem of a camera erroneously determining a finger position. Therefore, it needs to improve the prior arts to provide an improved OSK technology, so as to provide the feedback of keystrokes in real time, the feedback of "a finger standby position" of the user on the physical keyboard in real time, and avoid a problem that the camera erroneously determines "the finger standby position". The improved OSK technology becomes a good tool for training touch typing. In addition, being applied to a head-up display, a head-mounted display, or a virtual reality (VR) device also resolves a problem that the user cannot directly look at the physical keyboard, and may assist the user who formerly is not good at touch typing to type data by using the physical keyboard and display the data on the screen/head-up display/head-mounted display/VR device.

SUMMARY

In view of this, the present invention provides a method for displaying an on-screen keyboard, and a computer program product and a non-transitory computer readable medium of the on-screen keyboard, to display both keystroke information and information of finger standby positions by using an improved on-screen keyboard, so that a user only needs to focus his sight on the on-screen keyboard of an apparatus (such as the screen of a computer/mobile device/virtual reality display device), without staring at a physical keyboard, thereby accelerating a data typing speed.

An embodiment of the present invention provides a display method of an on-screen keyboard, applied to a computing device connected to a physical keyboard, a screen and a sensor, the physical keyboard including a plurality of keys, and the sensor being configured to detect and obtain an operating position image, where the display method of the on-screen keyboard includes: displaying an on-screen keyboard at a topmost layer of a displayed image of the screen; reading the operating position image obtained by the sensor; converting the operating position image into an "operating position data", where the operating position data includes a relative position data of a key which is touched or is approached; and according to the operating position data, displaying a first key mark at a position corresponding to the key which is touched or is approached on the on-screen keyboard.

The present invention also provides a computer program product comprising a plurality of computer executable instructions stored in a non-transitory computer readable medium. The computer executable instructions are loaded and executed by the computing device to cause the computing device to complete the above-described method for displaying an on-screen keyboard.

The present invention further provides a non-transitory computer readable medium storing a computer program, where the computer program includes a plurality of computer executable instructions for executing the above-described method for displaying an on-screen keyboard.

The following implementation manners describe features and advantages of the present invention in detail. The content enables any person skilled in the art to know technical content of the present invention and implement the technical content. A person skilled in the art can easily understand the objectives and advantages of the present invention according to the content, the application scope, and drawings disclosed in this specification.

DETAILED DESCRIPTION

The present invention is applied to but not limited to computing devices such as, a personal computer (PC/Mac), a notebook computer (Laptop/Portable Computer), a Smartphone, a tablet PC, a Smart TV, a head-up display/head-mounted display/virtual reality display device, and a video game console or TV game console, etc. which are in communication connections to physical keyboards 10, 20, 30, 40, and 50 and screens 76a, 76b, and 76c. The communication connection manner may be a wireless or wired communication manner. The physical keyboards 10, 20, 30, 40, and 50 and the screens 76a, 76b, and 76c may be disposed outside the computing device and to be connected thereto, or may be disposed as a part of the computing device.

The accompanying drawings of the present description are used to describe the functions and technical features of the present invention, and are not intended to limit the appearance of the present invention. A plurality of embodiments of the physical keyboards 10, 20, 30, 40, and 50 and a plurality of embodiments of on-screen keyboard 68a, 68b, 68c, and 68d are respectively described below. The physical keyboards 10, 20, 30, 40, and 50 of these different embodiments and the on-screen keyboard 68a, 68b, 68c, and 68d of these different embodiments may cooperate with each other arbitrarily.

Figure 1:
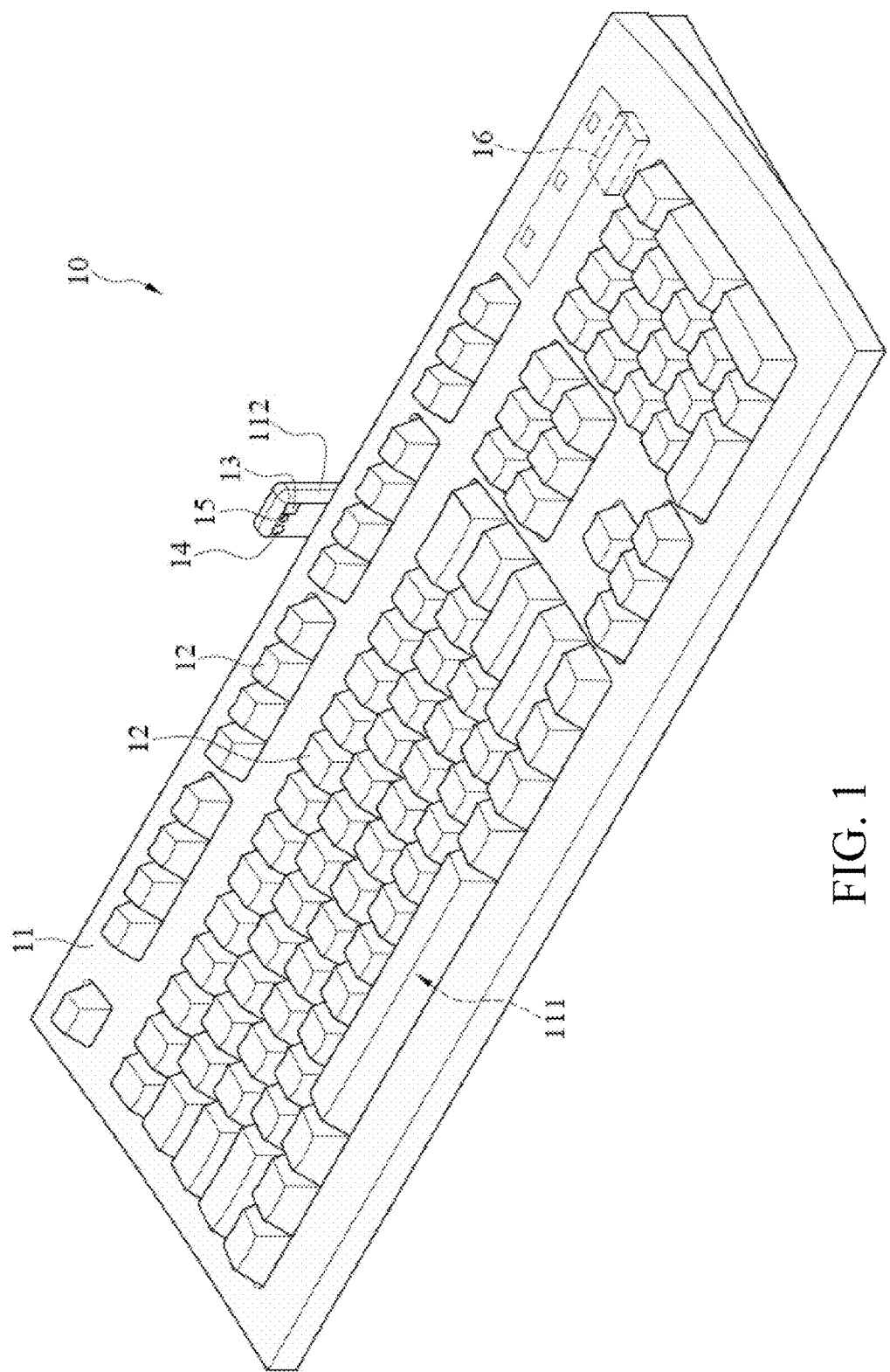
FIG. 1 is a schematic diagram of a physical keyboard device according to a first embodiment of the present invention.

Referring to FIG. 1, FIG. 1 is a schematic diagram of a physical keyboard according to a first embodiment of the present invention. A physical keyboard 10 in this embodiment includes a base 11, a plurality of keys 12, a light source module 13, a first sensor 14, a second sensor 15, and a control module 16. The base 11 includes an accommodating space 111 for accommodating the plurality of keys 12. The physical keyboard 10 shown in FIG. 1 accommodates the keys 12 having different functions by using the openings of multiple areas. This is an existing common technical means, and is not described in detail herein.

The light source module 13 is disposed on the base 11, and is configured to provide a light source for the plurality of keys 12. As shown in FIG. 1, a holder 112 for accommodating the light source module 13 is disposed on an outer side at a central position of an upper longer side of the base 11. The light source module 13 is disposed facing the plurality of keys 12, to provide a light source required by the plurality of keys 12. In this embodiment, to provide the light source for all of the keys 12, a height at which the light source module 13 is disposed is higher than those of all of the keys, so that the light source emitted by the light source module 13 can be irradiated onto all keys 12, or a sufficient ambient luminance is generated in the areas in which all of the keys 12 are located. In addition, the light source module 13 may be an LED element, and can emit visible light. In another implementation aspect, the light source module may be an LED element capable of emitting infrared light. No limitation is imposed herein in the present invention.

The first sensor 14 and the second sensor 15 are also disposed on the base 11, and face the plurality of keys 12. In this embodiment, the first sensor 14 and the second sensor 15 are also disposed on the holder 112, and face the plurality of keys 12. The first sensor 14 is configured to detect an ambient luminance of the plurality of keys 12. The second sensor 15 is configured to detect and obtain an "operating position image". In this embodiment, the holder 112 is disposed on the outer side at the central position of the upper longer side of the base 11, so that the light source module 13, the first sensor 14, and the second sensor 15 can provide the light source for the plurality of keys 12 in a left-right symmetric manner or perform detection in a left-right symmetric manner. However, no limitation is imposed herein in the present invention. In another implementation aspect, the holder 112 may be disposed at any position on any side of the base 11, as long as a light source can be provided for the plurality of keys 12, and the plurality of keys 12 can be detected or irradiated. In addition, in this embodiment, the light source module 13, the first sensor 14, and the second sensor 15 are all disposed on the same holder 112. However, no limitation is imposed herein in the present invention. The light source module 13, the first sensor 14, and the second sensor 15 may also be respectively disposed at any position of the base 11, or every two may be disposed at any position of the base 11. Alternatively, the first sensor 14 is disposed at any position of the base 11, and the light source module 13 and the second sensor 15 are disposed on the same holder 112.

In this embodiment, the first sensor 14 is a luminance sensor, or referred to as an ambient light sensor. The first sensor 14 can detect a luminance of an environment in which the plurality of keys 12 is located. The first sensor 14 is configured to determine whether the luminance of the environment in which the plurality of keys 12 is located is sufficient, to enable the second sensor 15 to detect and obtain required data.

Figure 5:
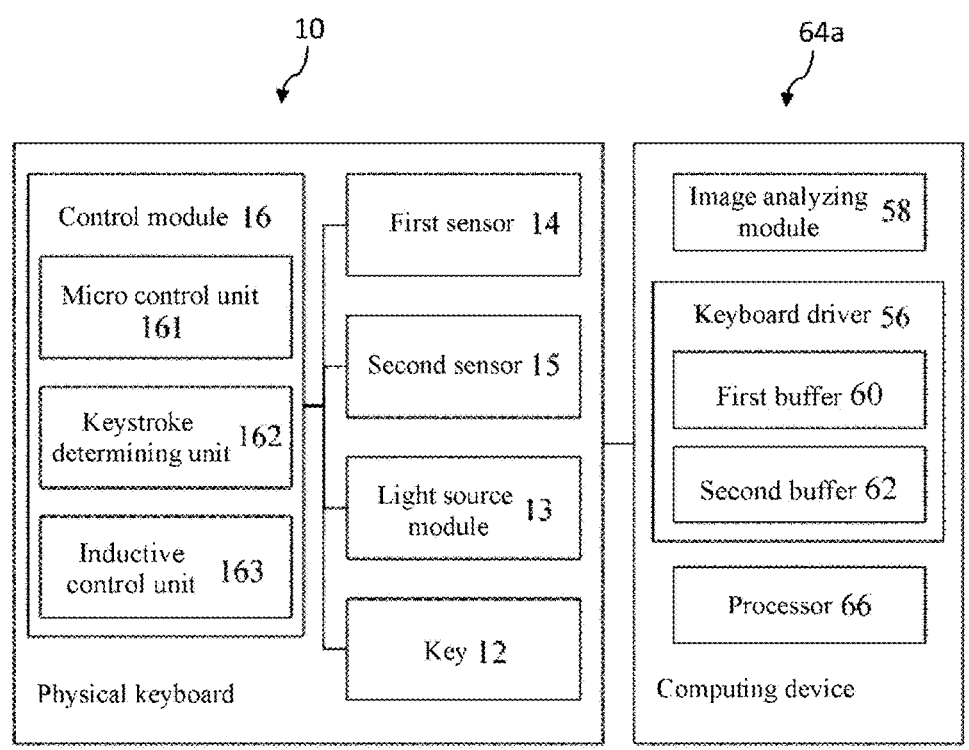
FIG. 5 is a system block diagram of a physical keyboard device and a corresponding computing device according to a first embodiment of the present invention.

In this embodiment, the second sensor 15 is a camera (or a camera module). The operating position image detected and obtained by the second sensor 15 is an image, which is a photo image of a finger (fingers) and keys 12, obtained by photographing. The image is transmitted to a computing device 64*a* (as shown in FIG. 5) by the control module 16. An image analyzing module 58 disposed on the computing device 64*a* analyzes the image, to obtain the "operating position data", where the operating position data includes a relative position data of a key 12 which is touched or is approached, that is, "the data of relative positions between a finger (or fingers) of a user and the keys 12". Because the second sensor 15 can correctly determine the data of relative positions between a finger (or fingers) of a user and the keys 12 only if all of the keys 12 are photographed, a position at which the second sensor 15 is disposed needs to be higher than a surface of any key 12.

The control module 16 is disposed in the accommodating space 111 of the base 11, and electrically connected to the plurality of keys 12, the light source module 13, the first sensor 14, and the second sensor 15. The control module 16 may be located at any position in the accommodating space 111 of the base 11. No limitation is imposed herein in the present invention. When receiving the ambient luminance detected by the first sensor 14 and determining that the ambient luminance detected by the first sensor 14 is equal to or greater than a preset ambient luminance, the control module 16 turns on the second sensor 15 and receives the operating position image of the second sensor 15. When determining that the ambient luminance detected by the first sensor 14 is less than the preset ambient luminance, the control module 16 turns on the light source module 13 to provide the light source for the plurality of keys 12.

The preset ambient luminance herein is an ambient luminance at which the second sensor 15 can clearly detect and obtain the operating position image. The preset ambient luminance may be specified in advance, and then pre-stored in the control module 16 to facilitate subsequent comparison and determining. The operating position image received by the control module 16 needs to be analyzed by the computing device 64*a*.

Before starting to obtain the operating position image, the control module 16 first determines whether the ambient luminance detected by the first sensor 14 is equal to or greater than the preset ambient luminance. If the ambient luminance detected by the first sensor 14 is equal to or greater than the preset ambient luminance, it indicates that the second sensor 15 can clearly detect and obtain the operating position image. In this case, the second sensor 15 is turned on to start photographing and detect and obtain the operating position image. When the control module 16 determines that the ambient luminance detected by the first sensor 14 is less than the preset ambient luminance, it indicates that the image photographed by the second sensor 15 may be excessively dark from which the operating position image cannot be detected and obtained, so that the control module 16 turns on the light source module 13 to provide the light source for the plurality of keys 12, to improve the ambient luminance of the areas in which the plurality of keys 12 is located.

In this way, the foregoing physical keyboard 10 can resolve the problem of the insufficient ambient light source by using an automatic supplemental lighting technology. When the foregoing physical keyboard 10 is applied to a head-up display, a head-mounted display, or a virtual reality display (VR) device, even if in a dark environment in which no lamp is turned on, a user can still type data with a physical keyboard 10 by means of the automatic supplemental lighting technology in the this embodiment.

In this embodiment, when the second sensor 15 is already turned on, keeps photographing, and detects and obtains the operating position image, the control module 16 can know whether the operating position image includes "the data of relative positions between a finger (or fingers) and the plurality of keys 12" (refer to description of FIG. 5 below for details). When the operating position image does not include the "the data of relative positions between a finger (or fingers) and the plurality of keys 12", it indicates that the user does not continue operating the physical keyboard 10. In this case, the control module 16 turns off the second sensor 15, and the second sensor 15 stops photographing or detecting and obtaining the operating position image. In this way, the second sensor 15 may be turned off automatically when the user does not operate the physical keyboard 10, or has not operated the physical keyboard 10 for an idle timeout, to save power.

In addition, when the light source module 13 is in a turn-on state, the first sensor 14 keeps detecting an ambient luminance. When the ambient luminance detected by the first sensor 14 is greater than the preset ambient luminance, the control module 16 turns off the light source module 13. In this case, the ambient luminance has been improved, for example, the user has turned on an indoor lamp, and the ambient luminance detected by the first sensor 14 is greater than the preset ambient luminance, so that assistance from the light source of the light source module 13 is not needed. In this case, the control module 16 automatically turns off the light source module 13, to save power.

Figure 2:
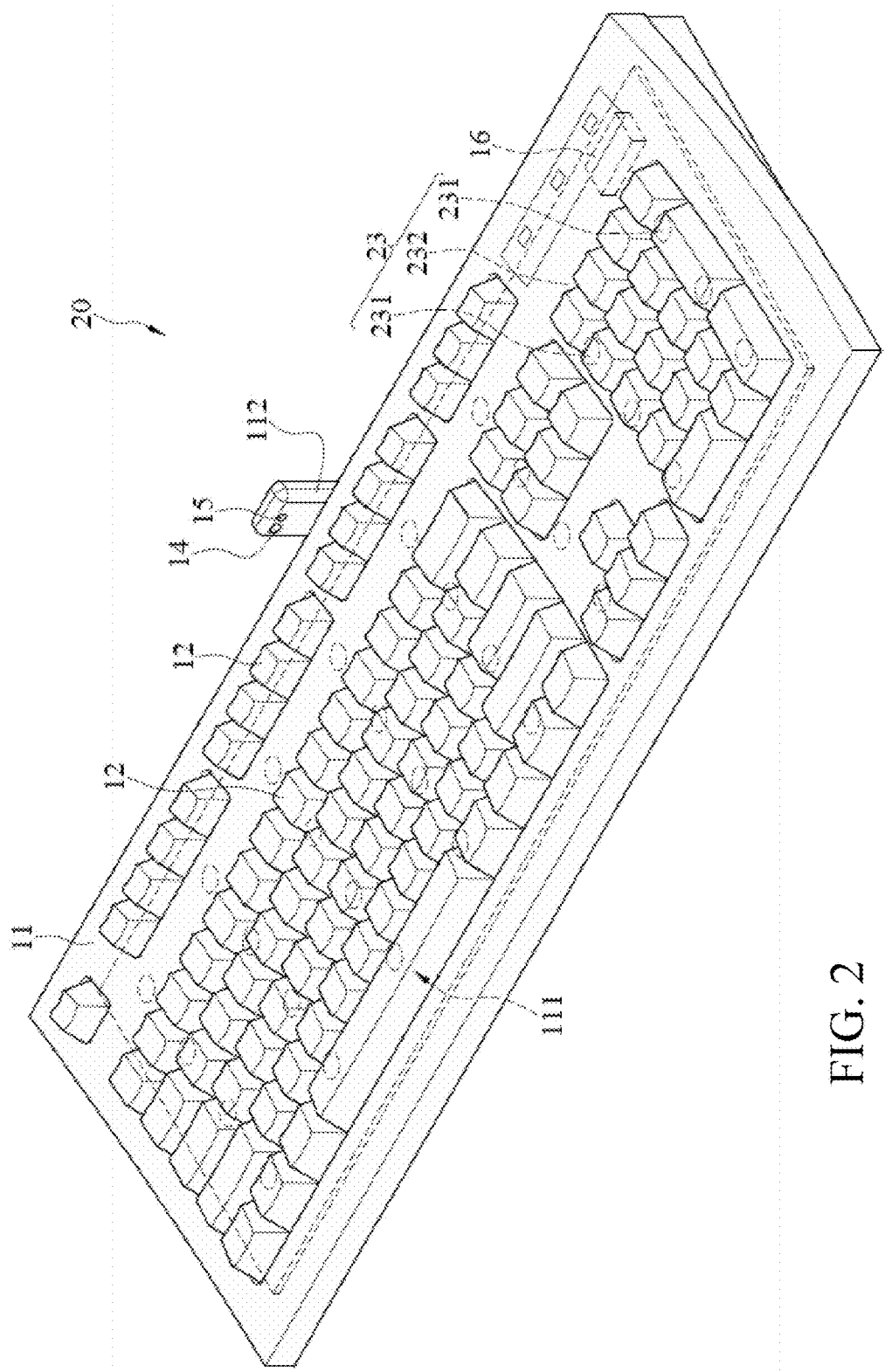
FIG. 2 is a schematic diagram of a physical keyboard device according to a second embodiment of the present invention.

Next, referring to FIG. 2, FIG. 2 is a schematic diagram of a physical keyboard 20 according to a second embodiment of the present invention. Elements and structures in this embodiment that are the same as those in the first embodiment are represented by using the same element symbols, and are not described in detail herein again. This embodiment is different from the first embodiment in that a physical keyboard 20 in this embodiment includes a plurality of light source modules, that is, light source modules 23, and the plurality of light source modules 23 is disposed in an accommodating space 111 of a base 11 and below the plurality of keys 12, and faces the plurality of keys 12, to provide a light source. The plurality of light source modules 23 in this embodiment is a plurality of LED elements 231 disposed on a circuit board 232 and below the keys 12. In another implementation aspect, the plurality of light source modules may further be LED elements disposed beneath each keycap, or may be a plurality of LED elements disposed on a side of the accommodating space of the base, and enables, in cooperation with elements such as a light guide plate and a reflective plate, a light source to be emitted from the accommodating space toward the keys 12.

In this embodiment, when the control module 16 determines that an ambient luminance detected by the first sensor 14 is less than a preset ambient luminance, the control module 16 successively turns on at least one of the plurality of light source modules 23, until the control module 16 determines that the ambient luminance detected by the first sensor 14 is equal to or greater than the preset ambient luminance, or the plurality of light source modules 23 is all turned on. That is, when determining that the current ambient luminance is insufficient, the control module 16 may first control one or more light source modules 23 to be turned on, to provide the light source. Next, the control module 16 keeps receiving an ambient luminance detected by the first sensor 14 and determining the ambient luminance detected by the first sensor 14, and if the ambient luminance is still insufficient, the control module 16 further turns on one or more light source modules 23. The control module 16 does not stop further enabling light source modules 23 until determining that the ambient luminance detected by the first sensor 14 is equal to or greater than the preset ambient luminance. Alternatively, the control module 16 successively turns on light source modules 23 until all light source modules 23 are turned on.

In this way, the control module 16 determines and turns on only light source modules 23 sufficient for providing a required ambient luminance without simultaneously turning on all light source modules 23 each time an ambient luminance is insufficient. Therefore, the physical keyboard 20 in this embodiment only needs to turn on a sufficient number of light source modules 23, thereby achieving an effect of power saving.

Figure 3:
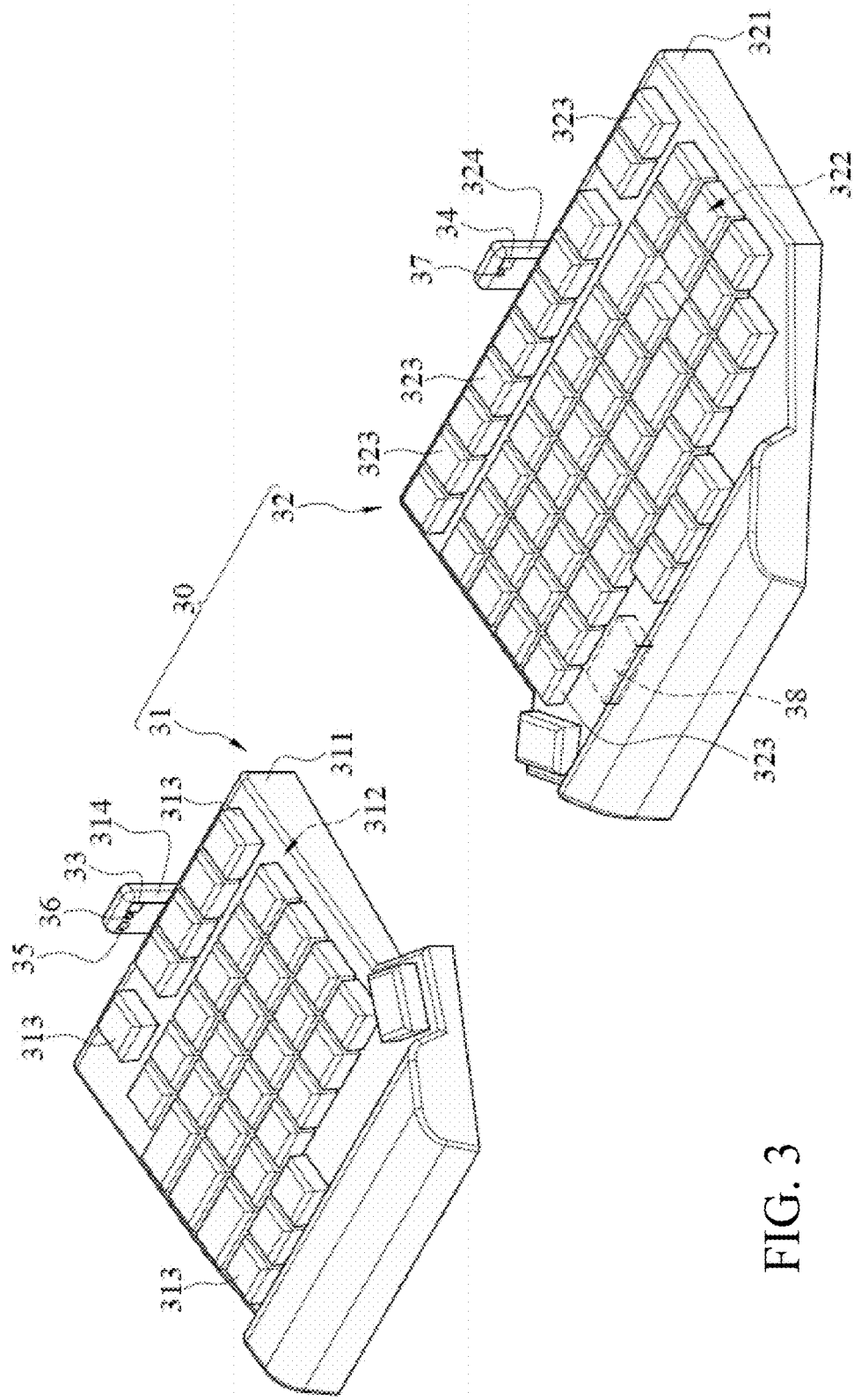
FIG. 3 is a schematic diagram of a physical keyboard device according to a third embodiment of the present invention.

Referring to FIG. 3, FIG. 3 is a schematic diagram of a physical keyboard 30 according to a third embodiment of the present invention. A physical keyboard 30 in this embodiment includes a first keyboard 31, a second keyboard 32, a first light source module 33, a second light source module 34, a first sensor 35, a second sensor 36, a third sensor 37, and a control module 38. The first keyboard 31 includes: a first base 311 that includes a first accommodating space 312, and a plurality of first keys 313. The plurality of first keys 313 is disposed in the first accommodating space 312. The second keyboard 32 includes: a second base 321 that includes a second accommodating space 322, and a plurality of second keys 323. The plurality of second keys 323 is disposed in the second accommodating space 322. In this embodiment, the first keyboard 31 and the second keyboard 32 are respectively a left keyboard and a right keyboard that can be used in pair and that are formed by dividing keys on a common keyboard into two groups. However, no limitation is imposed herein in the present invention. Alternatively, the first keyboard and the second keyboard may be a combination of a letter symbol keyboard and a numeric keyboard.

The first light source module 33 is disposed on the first base 311, and is configured to provide a first light source for the plurality of first keys 313. As shown in FIG. 3, a first holder 314 for accommodating the first light source module 33 is disposed on an outer side at a central position of an upper longer side of the first base 311. The first light source module 33 is disposed facing the plurality of first keys 313, to provide the light source required by the plurality of first keys 313. In this embodiment, to provide the light source for all of the first keys 313, a height of a position of the first light source module 33 is higher than those of all keys, so that the light source emitted by the first light source module 33 can be irradiated onto all of the first keys 313, or a sufficient ambient luminance can be generated in areas in which all of the first keys 313 are located.

Similarly, the second light source module 34 is disposed on the second base 321, and is configured to provide a second light source for the plurality of second keys 323. As shown in FIG. 3, a second holder 324 for accommodating the second light source module 34 is disposed on an outer side at a central position of an upper longer side of the second base 321. The second light source module 34 is disposed facing the plurality of second keys 323, to provide the light source required by the plurality of second keys 323. In this embodiment, to provide the light source for all of the second keys 323, a height of a position of the second light source module 34 is higher than those of all of the keys, so that the light source emitted by the second light source module 34 can be irradiated onto all of the second keys 323, or a sufficient ambient luminance can be generated in areas in which all of the second keys 323 are located.

The first sensor 35 is disposed on the first base 311, and is configured to detect an ambient luminance of the plurality of first keys 313. As shown in FIG. 3, the first sensor 35 is disposed on the first holder 314, and faces the plurality of first keys 313. Because the first sensor 35 does not need to face all of the keys, and only needs to detect a single point, in other embodiments, the first sensor 35 may be disposed at another position of the first base 311 or the second base 321, for example, in a plane space (less than a height of a key) near any key. In addition, the first keyboard 31 is usually not excessively distant from the second keyboard 32, and an ambient luminance of the first keyboard 31 is usually not excessively different from the second keyboard 32. Therefore, in this embodiment, the first sensor 35 (detecting only the ambient luminance of the first keyboard 31) enables the control module 16 to simultaneously control the first light source module 33 and the second light source module 34.

In this embodiment, the first sensor 35 is a luminance sensor, or referred to as an ambient light sensor. The first sensor 35 can detect a luminance of an environment in which the plurality of first keys 313 is located. In other embodiments, the first sensor 35 is disposed on the second base 321 of the second keyboard 32, to detect a luminance of an environment in which the plurality of second keys 323 is located. The first sensor 35 is configured to determine whether the luminance of the environment, in which the plurality of first keys 313 (when disposed on the first keyboard 31) or the plurality of second keys 323 (when disposed on the second keyboard 32) is located, is sufficient, to enable the second sensor 36 and the third sensor 37 to detect and obtain required data.

The second sensor 36 is disposed on the first base 311, and faces the plurality of first keys 313. In this embodiment, both the second sensor 36 and the first light source module 33 are disposed on the first holder 314, and face the plurality of first keys 313. The second sensor 36 is configured to detect and obtain first operating position image. In this embodiment, the first holder 314 is disposed on the outer side of the central position on an upper side of the first base 311, so as to enable the first light source module 33 and the second sensor 36 to provide the light source for the plurality of first keys 313 in a left-right symmetric manner or perform detection in a left-right symmetric manner. However, no limitation is imposed herein in the present invention. In another implementation aspect, the first holder 314 may be disposed at any position on any side of the first base 311, as long as the light source can be provided for the plurality of first keys 313, and the plurality of first keys 313 can be detected and irradiated. In addition, in this embodiment, both the first light source module 33 and the second sensor 36 are disposed on the same first holder 314. However, no limitation is imposed herein in the present invention. The first light source module 33 and the second sensor 36 may further be respectively disposed at any position of the first base 311.

The third sensor 37 is disposed on the second base 321, and faces the plurality of second keys 323. In this embodiment, both the third sensor 37 and the second light source module 34 are disposed on the second holder 324, and face the plurality of second keys 323. The third sensor 37 is configured to detect and obtain second operating position image. In this embodiment, the second holder 324 is disposed on the outer side of the central position on the upper side of the second base 321, so that the second light source module 34 and the third sensor 37 can provide the light source for the plurality of second keys 323 in a left-right symmetric manner or perform detection in a left-right symmetric manner. However, no limitation is imposed herein in the present invention. In another implementation aspect, the second holder 324 may be disposed at any position on any side of the second base 321, as long as it is capable of providing the light source for the plurality of second keys 323, and the plurality of second keys 323 can be detected and irradiated. In addition, both the second light source module 34 and the third sensor 37 in this embodiment are disposed on the same second holder 324. However, no limitation is imposed herein in the present invention. The second light source module 34 and the third sensor 37 may further be respectively disposed at any position of the second base 321.

In this embodiment, the second sensor 36 and the third sensor 37 are cameras (or camera modules). The operating position image detected and obtained by the second sensor 36 and the operating position image detected and obtained by the third sensor 37 are respectively a first image and a second image that are obtained by photographing. The first image and the second image are transmitted to a computing device 64a by the control module 38. An image analyzing module 58 disposed on the computing device 64a analyzes the images, to obtain the operating position data (that is, "data of relative positions between a finger/fingers of a user and the plurality of first keys 313", or "data of relative positions between a finger/fingers of a user and the plurality of second keys 323"). Because the second sensor 36 can correctly determine the "data of relative positions between a finger/fingers of a user and the plurality of first keys 313" only when all first keys 313 are photographed, and the third sensor 37 can correctly determine the "data of relative positions between a finger/fingers of a user and the plurality of second keys 323" only when all second keys 323 are photographed, a position of the second sensor 36 needs to be higher than a surface of any one of the first keys 313, and a position of the third sensor 37 needs to be higher than a surface of any one of the second keys 323.

The control module 38 is disposed in the second accommodating space 322, and is electrically connected to the plurality of first keys 313, the plurality of second keys 323, the first light source module 33, the second light source module 34, the first sensor 35, the second sensor 36, and the third sensor 37. Although the control module 38 herein is located in the second accommodating space 322, no limitation is imposed herein in the present invention. However, in another implementation aspect, the control module may further be disposed in the first accommodating space. In addition, although the control module 38 in this embodiment is disposed in the second accommodating space 322, the control module 38 can control, by using a wireless module, each element in the first keyboard 31 to be turned on or off, and can receive data detected and obtained by each element in the first keyboard 31. In another implementation aspect, the first keyboard and the second keyboard may further be connected in a wired manner No limitation is imposed herein in the present invention. In addition, in some implementation aspects, a first control module may be disposed in the first keyboard, and a second control module may be disposed in the second keyboard, to respectively control operation of each element in the first keyboard and the second keyboard.

When determining that the ambient luminance detected by the first sensor 35 is equal to or greater than a preset ambient luminance, the control module 38 turns on the second sensor 36 and the third sensor 37, and receives the first operating position image of the second sensor 36 and the second operating position image of the third sensor 37. When determining that the ambient luminance detected by the first sensor 35 is less than the preset ambient luminance, the control module 38 turns on the first light source module 33 to provide the first light source for the plurality of first keys 313, or turns on the second light source module 34 to provide the second light source for the plurality of second keys 323, or simultaneously turns on the first light source module 33 and the second light source module 34.

The preset ambient luminance herein is an ambient luminance at which the second sensor 36 and the third sensor 37 can clearly detect and obtain the operating position image. The preset ambient luminance may be specified in advance, and pre-stored in the control module 38 to facilitate subsequent comparison and determining. The operating position images received by the control module 38 need to be analyzed by the computing device 64a.

Before starting to obtain the first operating position image and the second operating position image, the control module 38 needs to first determine whether the ambient luminance detected by the first sensor 35 is equal to or greater than the preset ambient luminance. If the ambient luminance detected by the first sensor 35 is equal to or greater than the preset ambient luminance, it indicates that the second sensor 36 and the third sensor 37 can clearly detect and obtain the operating position images. In this case, the control module 38 turns on the second sensor 36 and the third sensor 37 to start photographing and detect and obtain the first operating position image and the second operating position image. When the control module 38 determines that the ambient luminance detected by the first sensor 35 is less than the preset ambient luminance, it indicates that the image photographed by the second sensor 36 or the third sensor 37 may be excessively dark from which the first operating position image or the second operating position image cannot be detected and obtained. In this case, the control module 38 turns on the first light source module 33 to provide a light source for the plurality of first keys 313, or turns on the second light source module 34 to provide a light source for the plurality of second keys 323, or simultaneously turns on the first light source module 33 and the second light source module 34, to improve the ambient luminance of areas in which the plurality of first keys 313 and the plurality of second keys 323 are located.

In this way, the foregoing structure can resolve the problem of the insufficient ambient light source by using an automatic supplemental lighting technology on the left and right split keyboards. When the foregoing structure is applied to a head-up display, a head-mounted display, or a virtual reality display (VR) device, even if in a dark environment in which no lamp is turned on, a user can still type data with the physical keyboard 30 by means of the automatic supplemental lighting technology in the this embodiment.

In this embodiment, after the second sensor 36 and the third sensor 37 are already turned on, keep photographing, and detect and obtain the first operating position image and the second operating position image, the control module 38 can learn whether the first operating position image includes the "data of relative positions between a finger/fingers and the plurality of the first keys 313", and whether the second operating position image includes the "data of relative positions between a finger/fingers and the plurality of the second keys 323". The first and second operating position data may be analyzed by the computing device 64a and then, transmitted back to the control module 38. Reference may be made to the descriptions about FIG. 5 in the following for details. Although the device in FIG. 5 is not the device of this embodiment, the principles are substantially the same. When neither the first operating position image nor the second operating position image includes the "data of relative positions between a finger/fingers and the plurality of the first keys 313" and the "data of relative positions between a finger/fingers and the plurality of the second keys 323", it indicates that the user does not continue operating the physical keyboard 30. In this case, the control module 38 turns off the second sensor 36 and the third sensor 37 and does not continue photographing or detecting and obtaining first operating position image and second operating position image. In this case, the second sensor 36 and the third sensor 37 may be turned off automatically when the user does not operate the physical keyboard 30, or has not operated the physical keyboard 30 for an idle timeout, to save power.

In addition, when the first light source module 33 or the second light source module 34 is in a turn-on state, and the ambient luminance detected by the first sensor 35 is equal to or greater than the preset ambient luminance, the control module 38 turns off the first light source module 33 or the second light source module 34. That is, when the first light source module 33 is in a turn-on state, or the second light source module 34 is in a turn-on state, or both the first light source module 33 and the second light source module 34 are in a turn-on state, the first sensor 35 keeps detecting an ambient luminance. When the ambient luminance detected by the first sensor 35 is greater than the preset ambient luminance, the control module 38 turns off the first light source module 33 and the second light source module 34. In this case, the ambient luminance has been improved, for example, the user has turned on an indoor lamp, and the ambient luminance detected by the first sensor 35 is greater than the preset ambient luminance, so that assistance from the light source of the first light source module 33 or the second light source module 34 is not needed. In this case, the control module 38 automatically turns off the first light source module 33 and/or the second light source module 34, to save power.

Figure 4:
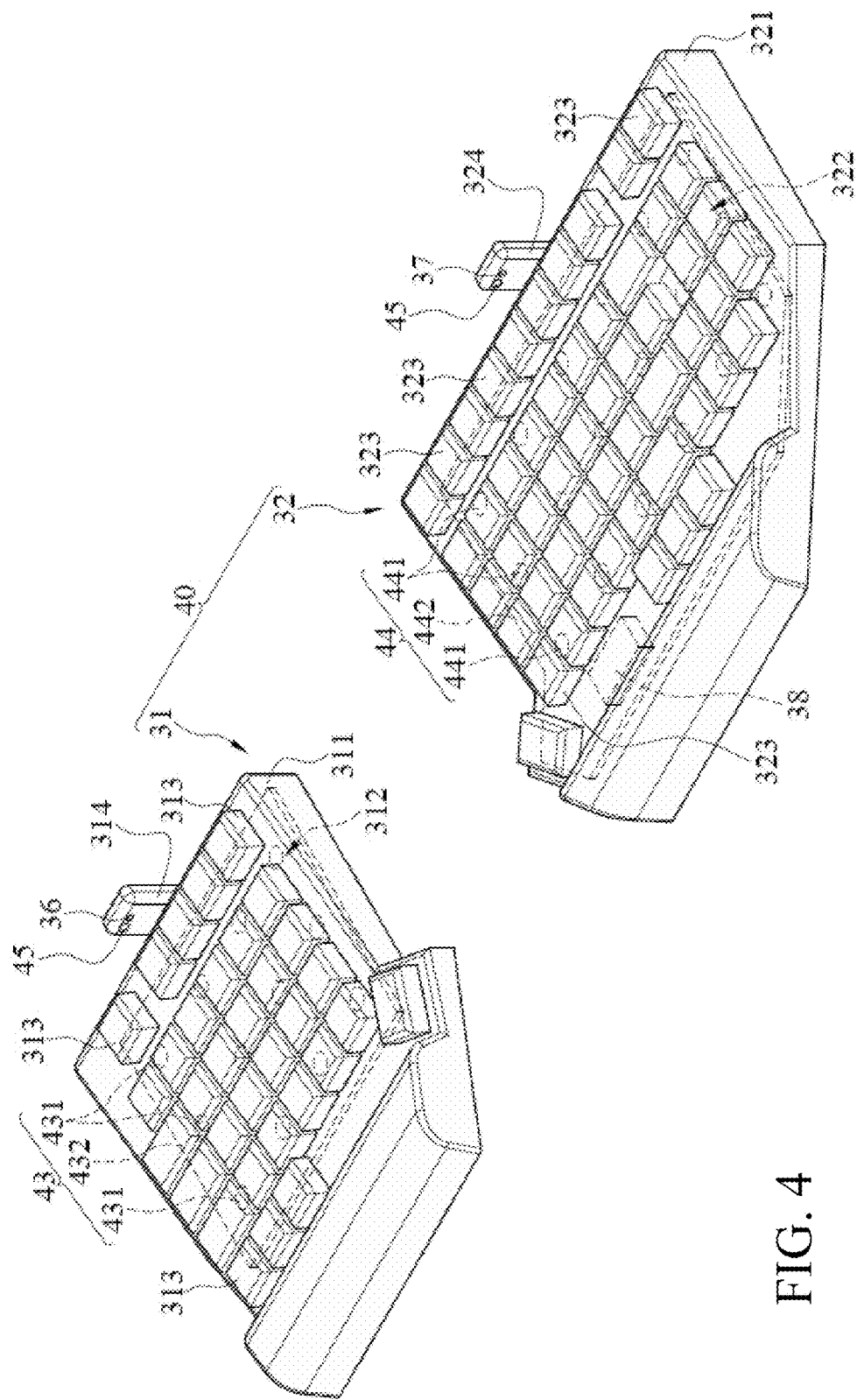
FIG. 4 is a schematic diagram of a physical keyboard device according to a fourth embodiment of the present invention.

Subsequently, referring to FIG. 4, FIG. 4 is a schematic diagram of a physical keyboard 40 according to a fourth embodiment of the present invention. Elements and structures in this embodiment that are the same as those in the third embodiment are represented by using the same element symbols, and are not described in detail herein again. This embodiment is different from the third embodiment in that a physical keyboard 40 in this embodiment includes a plurality of first light source modules, that is, first light source modules 43, and the plurality of first light source modules 43 is disposed in a first accommodating space 312 of a first base 311 and below the plurality of first keys 313 and can provide a first light source toward the plurality of first keys 313. In addition, there is a plurality of second light source modules, that is, second light source modules 44, and the plurality of second light source modules 44 is disposed in a second accommodating space 322 of the second base 321 and below the plurality of second key 323, and can provide a second light source toward the plurality of second keys 323.

The plurality of first light source modules 43 in this embodiment is a plurality of LED elements 431 that is disposed on a circuit board 432 and below the first keys 313. The plurality of second light source modules 44 is a plurality of LED elements 441 that is disposed on a circuit board 442 and below the second keys 323. In another implementation aspect, the plurality of light source modules may further be LED elements disposed beneath each keycap, or may be a plurality of LED elements disposed on a side of the accommodating space of the base, and enables, in cooperation with elements such as a light guide plate and a reflective plate, a light source to be emitted from the accommodating space toward the keys.

In addition, this embodiment is different from the third embodiment in that there are two first sensors 45. One of the first sensors 45 is disposed on the first base 311, and is, together with the second sensor 36, disposed on the first holder 314 in this embodiment. The other first sensor 45 is disposed on the second base 321, and is, together with the third sensor 37, disposed on the second holder 324 in this embodiment.

Further, first sensors 45 for detecting the plurality of first keys 313 and the plurality of second keys 323 are respectively disposed on the first keyboard 31 and the second keyboard 32 to detect an ambient luminance of the first keyboard 31 and an ambient luminance of the second keyboard 32, to obtain an ambient luminance value of each keyboard. In this way, the first light source module 43 and the second light source module 44 may be respectively controlled to be turned on or off, to obtain a required ambient luminance, so that the first light source module 43 and the second light source module 44 do not need to be simultaneously turned on, thereby achieving an effect of power saving.

In this embodiment, when determining that the ambient luminance detected by the first sensor 45 located on the first base 311 is less than a preset ambient luminance, the control module 38 successively turns on at least one of the plurality of first light source modules 43 until the control module 38 determines the ambient luminance detected by the first sensor 45 is equal to or greater than the preset ambient luminance, or until the plurality of first light source modules 43 is all turned on. That is, when determining that the current ambient luminance is insufficient, the control module 38 may first control one first light source module 43 to be turned on (controlling an LED element 431 to be turned on herein), to provide a light source. Subsequently, the control module 38 keeps receiving and determining the ambient luminance detected by the first sensor 45, and if the ambient luminance is still insufficient, the control module 38 further turns on a first light source modules 43 (controlling an LED element 431 to be turned on herein). The control module 38 does not stop further turning on first light source module 43 until determining that the ambient luminance detected by the first sensor 45 is equal to or greater than the preset ambient luminance. Alternatively, the control module 38 successively turns on first light source modules 43 until all of the first light source modules 43 are turned on. Although an example is used, in which one LED element is turned on at a time, for description herein, in another implementation aspect, two or more LED elements may be grouped into one group, so that two or more LED elements 431 can be turned on at a time.

Similarly, when determining that the ambient luminance detected by the first sensor 45 located on the second base 321 is less than the preset ambient luminance, the control module 38 successively turns on at least one of the plurality of second source modules 44, until the control module 38 determines that the ambient luminance detected by the first sensor 45 is equal to or greater than the preset ambient luminance, or the plurality of second light source modules 44 is all turned on. That is, when determining that the current ambient luminance is insufficient, the control module 38 may first control a second light source modules 44 to be turned on (controlling an LED element 441 to be turned on herein), to provide a light source. Subsequently, the control module 38 keeps receiving and determining the ambient luminance detected by the first sensor 45. If the ambient luminance is still insufficient, the control module 16 further turns on a second light source module 44 (controlling an LED element 441 to be turned on herein). The control module 38 does not stop further turning on a second light source module 44 until determining that the ambient luminance detected by the first sensor 45 is equal to or greater than the preset ambient luminance. Alternatively, the control module 38 successively turns on second light source modules 44 until all of the second light source modules 44 are turned on. Although an example is used, in which one LED element 441 is turned on at a time, for description herein, in another implementation aspect, two or more LED elements 441 may be grouped into a group, so that two or more LED elements 441 can be turned on at a time.

In this way, the control module 38 performs determination to turn on only first light source modules 43 or second light source modules 44 sufficient for required ambient luminance, and does not need to simultaneously turn on all first light source modules 43 or second light source modules 44 each time the ambient luminance is insufficient. Therefore, the physical keyboard 40 in this embodiment not only can turn on sufficient first light source modules 43 or second light source modules 44 when necessary, but also can achieve an effect of power saving.

In addition, because there are two first sensors 45 that are respectively located on the first base 311 and the second base 321 in this embodiment, the ambient luminance of a plurality of first keys 313 and the ambient luminance of the second key 323 can be respectively detected. Therefore, when the first light source module 43 is in a turn-on state, and the ambient luminance detected by the first sensor 45 located on the first base 311 is equal to or greater than the preset ambient luminance, the control module 38 turns off the first light source module 43. Alternatively, when the second light source module 44 is in a turn-on state, and the ambient luminance detected by the first sensor 45 located on the second base 321 is equal to or greater than the preset ambient luminance, the control module 38 turns off the second light source module 44.

That is, when the first light source module 43 is in a turn-on state, or the second light source module 44 is in a turn-on state, or both the first light source module 43 and the second light source module 44 are in a turn-on state, the two first sensors 45 keep detecting an ambient luminance of the first keyboard 31 and an ambient luminance of the second keyboard 32, and respectively turns off the first light source module 43 or the second light source module 44 according to the ambient luminance detected by the first sensors 45. In this case, the ambient luminance has been improved, for example, the user has turned on an indoor lamp, and the ambient luminance detected by the first sensor 45 is greater than the preset ambient luminance, so that assistance from the light source of the first light source module 33 or the second light source module 34 is not needed. In this case, the control module 38 automatically turns off the first light source module 43 or the second light source module 44, to save power.

Referring to FIG. 5, FIG. 5 is a system block diagram of the physical keyboard according to the first embodiment of the present invention. The control module 16 further includes a micro control unit 161, a keystroke determining unit 162, and an inductive control unit 163. The keystroke determining unit 162 is electrically connected to a contact (or referred to as key contact) corresponding to each key 12, and is configured to: detect whether the contact switches from a normally open state to a conductive state because of a keystroke, so as to generate a key scan code accordingly. The micro control unit 161 stores the key scan code into a second buffer 62 of keyboard buffer of the computing device 64*a* by using a keyboard driver 56, and sends an interrupt request to a processor 66 of the computing device 64*a*. Subsequently, the processor 66 in the computing device 64*a* reads the key scan code from the second buffer 62 in response to the interrupt request, to learn which key 12 is depressed. The "keystroke" includes depressing (that is, Key Down, generating a "Make Code") and releasing (that is, Key Up, generating a "Brake Code") of a key. The forgoing is an acting procedure part of a keystroke on the physical keyboard in the present invention.

The inductive control unit 163 is electrically connected to the first sensor 14, the second sensor 15, and the light source module 13. The foregoing preset ambient luminance is stored in the inductive control unit 163. When the ambient luminance detected by the first sensor 14 is less than the preset ambient luminance, the inductive control unit 163 turns on the light source module 13 to provide a light source. When the detected ambient luminance is equal to or greater than the preset ambient luminance, the inductive control unit 163 turns on the second sensor 15 to start to detect and obtain the operating position image. The micro control unit 161 stores the operating position image detected and obtained by the second sensor 15 into a first buffer 60 of the keyboard buffer of the computing device 64a by using the keyboard driver 56, and sends the interrupt request to the processor 66 in the computing device 64a, to so that the processor 66 in the computing device 64a can read the operating position image from the first buffer 60 in response to the interrupt request. Subsequently, the image analyzing module 58 disposed on the computing device 64a analyzes the image data, to further obtain the operating position data, where the operating position data includes a relative position data of a key 12 which is touched or is approached, that is, "the data of relative positions between a finger (or fingers) of a user and the keys 12". When the operating position image cannot be identified and analyzed because the images are excessively dark, the image analyzing module 58 notifies the micro control unit 161, so that the inductive control unit 163 can turn on the light source module 13 to provide a light source or enhance the current light source. When the operating position data does not include "the data of relative positions between the finger/fingers and the keys 12", the image analyzing module 58 notifies the micro control unit 161, so that the inductive control unit 163 can turn off the second sensor 15 to stop detecting and obtaining the operating position image.

The foregoing described buffers use the first-in first-out (FIFO) data structure. In some embodiments, the operating position image is stored into a dedicated first buffer 60, the processor 66 of the computing device 64a is not notified by sending an interrupt request, and instead, the processor 66 of the computing device 64a automatically reads, in a polling manner and at intervals, the first buffer 60 dedicated to the operating position image. Similarly, after the key scan code is stored in a dedicated second buffer 62, the processor 66 of the computing device 64a automatically reads, in a polling manner and at intervals, the second buffer 62 dedicated to the key scan code.

Figure 6:
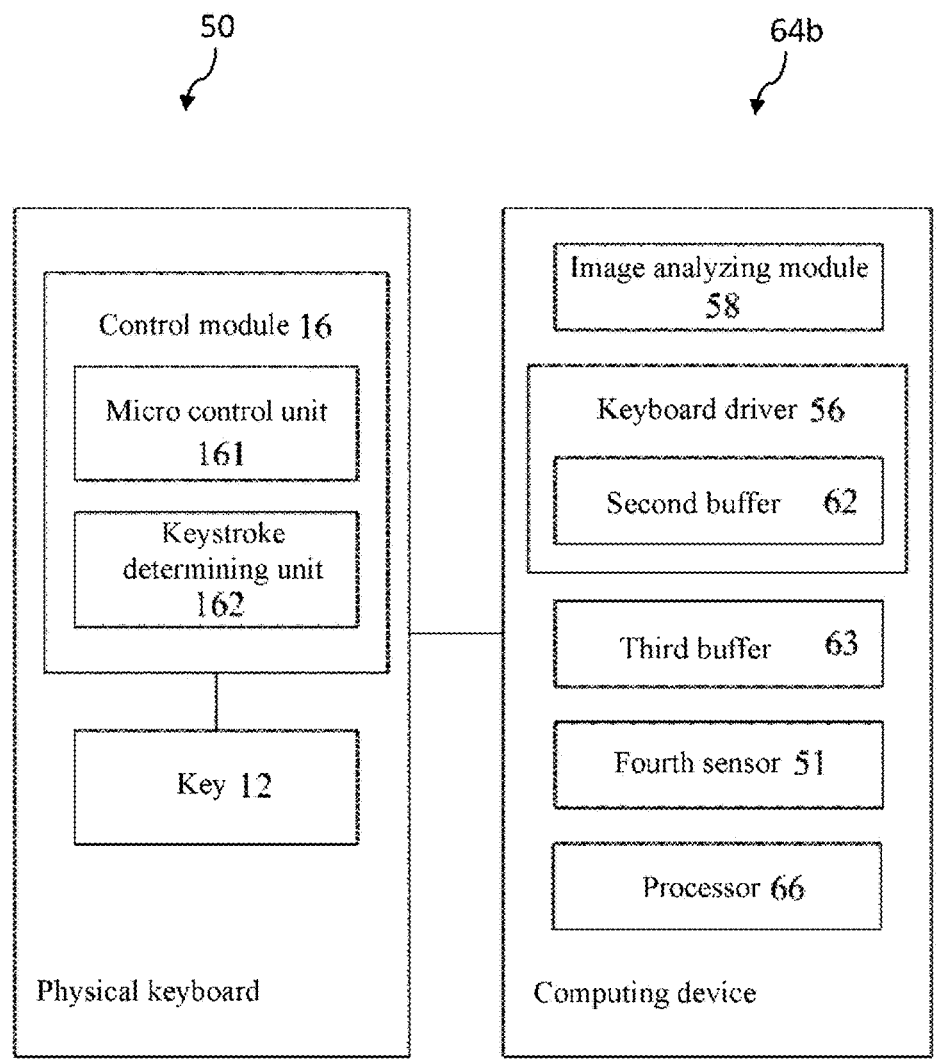
FIG. 6 is a system block diagram of a physical keyboard device and a corresponding computing device according to a fifth embodiment of the present invention.

Refer to FIG. 6. FIG. 6 is a system block diagram of a physical keyboard 50 and a corresponding computing device 64b according to a fifth embodiment of the present invention. A physical keyboard 50 of this embodiment differs from the physical keyboard of a first embodiment in that the physical keyboard 50 of this embodiment does not include any sensors, and functions and an operating flow of a keystroke determining unit 162 thereof are as stated in the first embodiment, and therefore details are not described herein again. A micro control unit 161 herein only processes a key scan code generated by the keystroke determining unit 162, and an operating flow thereof is also as stated in the first embodiment. Moreover, the computing device 64b mainly differs from the computing device 64a of the first embodiment in that the computing device 64b is provided with a fourth sensor 51 and a third buffer 63 individual from a keyboard buffer of the keyboard driver 56. The fourth sensor 51 is configured to detect and obtain an operating position image. In this embodiment, the fourth sensor 51 is a camera (or a camera module). The operating position image detected and obtained by the fourth sensor 51 is a captured photo image of a finger (or fingers) and keys 12. After the operating position image is stored into the third buffer 63, the image is analyzed by an image analyzing module 58, so as to be converted into an operating position data, where the operating position data includes relative position data of these keys 12 which are touched or approached, i.e., relative position data of the finger (or fingers) of the user and one of these keys 12. The fourth sensor 51 may be, for example, a built-in camera above a screen of a notebook computer, and further for example, a virtual reality device HTC Vive is provided a front-facing camera, where both may be configured to capture the operating position image of the physical keyboard 50.

Figure 7:
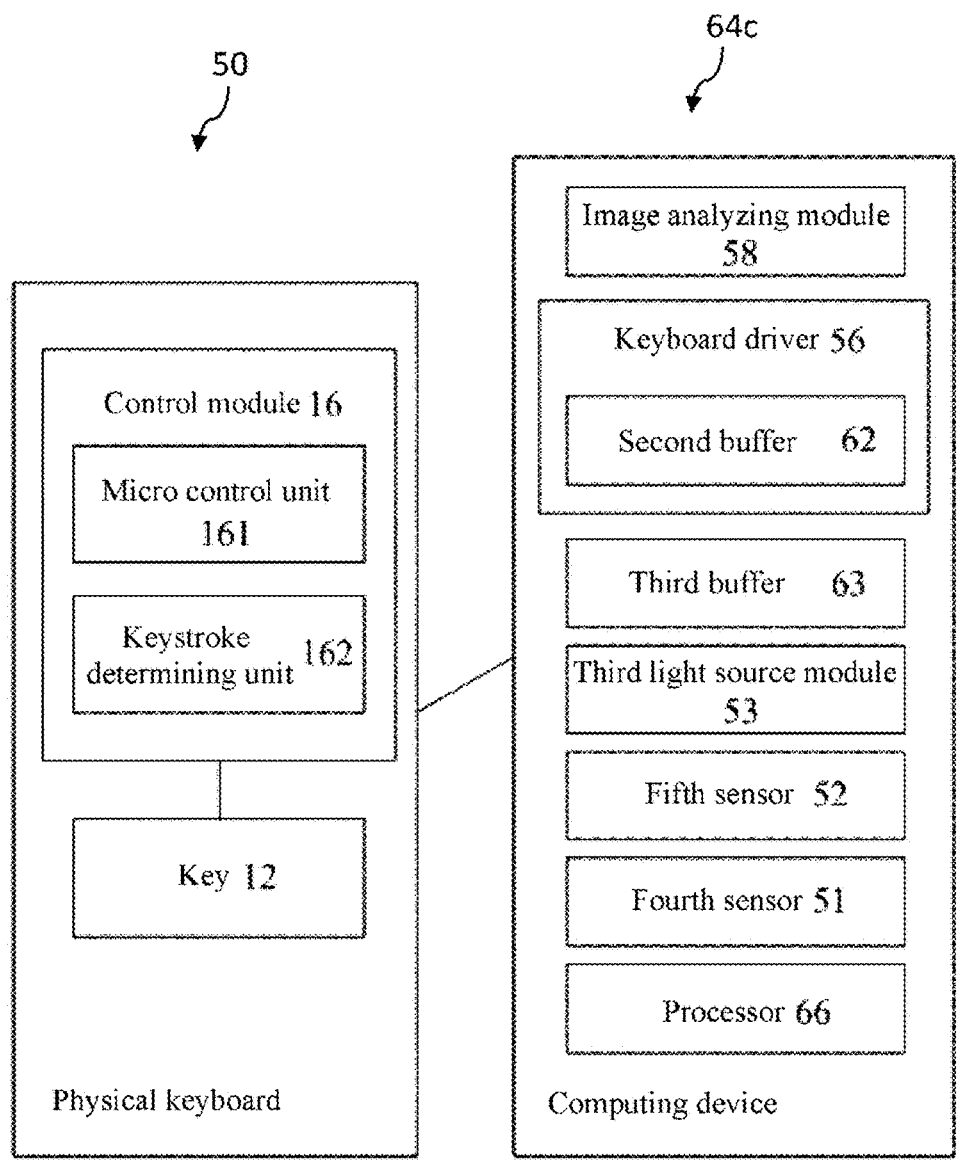
FIG. 7 is a system block diagram of a physical keyboard device and a corresponding computing device according to a sixth embodiment of the present invention.

Refer to FIG. 7. FIG. 7 is a system block diagram of a physical keyboard 50 and a corresponding computing device 64c according to a sixth embodiment of the present invention. The physical keyboard 50 of this embodiment is the same to that of the fifth embodiment, and therefore details are not described herein again. Moreover, the computing device 64c differs from the computing device 64b of the fifth embodiment in that a fifth sensor 52 and a third light source module 53 are added, where the fifth sensor 52 is configured to detect whether an ambient luminance of the plurality of keys 12 is sufficient, so that the fourth sensor 51 may detect and obtain required data. In this way, the fifth sensor 52 is a luminance sensor or called an ambient light sensor. The third light source module 53 may be an LED component, and may emit visible lights. In other implementation aspects, the third light source module 53 may also be an LED component emitting infrared light. The present invention is not limited thereto. When a processor 66 receives and determines that the ambient luminance detected by the fifth sensor 52 is equal to or greater than a preset ambient luminance, the fourth sensor 51 can be started and the operating position image of the fourth sensor 51 can be captured. When the processor 66 determines that the ambient luminance detected by the fifth sensor 52 is smaller than the preset ambient luminance, the processor 66 enables the third light source module 53 to provide a light source of the plurality of keys 12.

The following display method of the on-screen keyboard and the computer program product and non-transitory computer readable storage medium thereof according to the present invention are implemented by using physical keyboards 10, 20, 30, 40, and 50 and computing devices 64a, 64b, and 64c of the foregoing embodiments.

Figure 8:
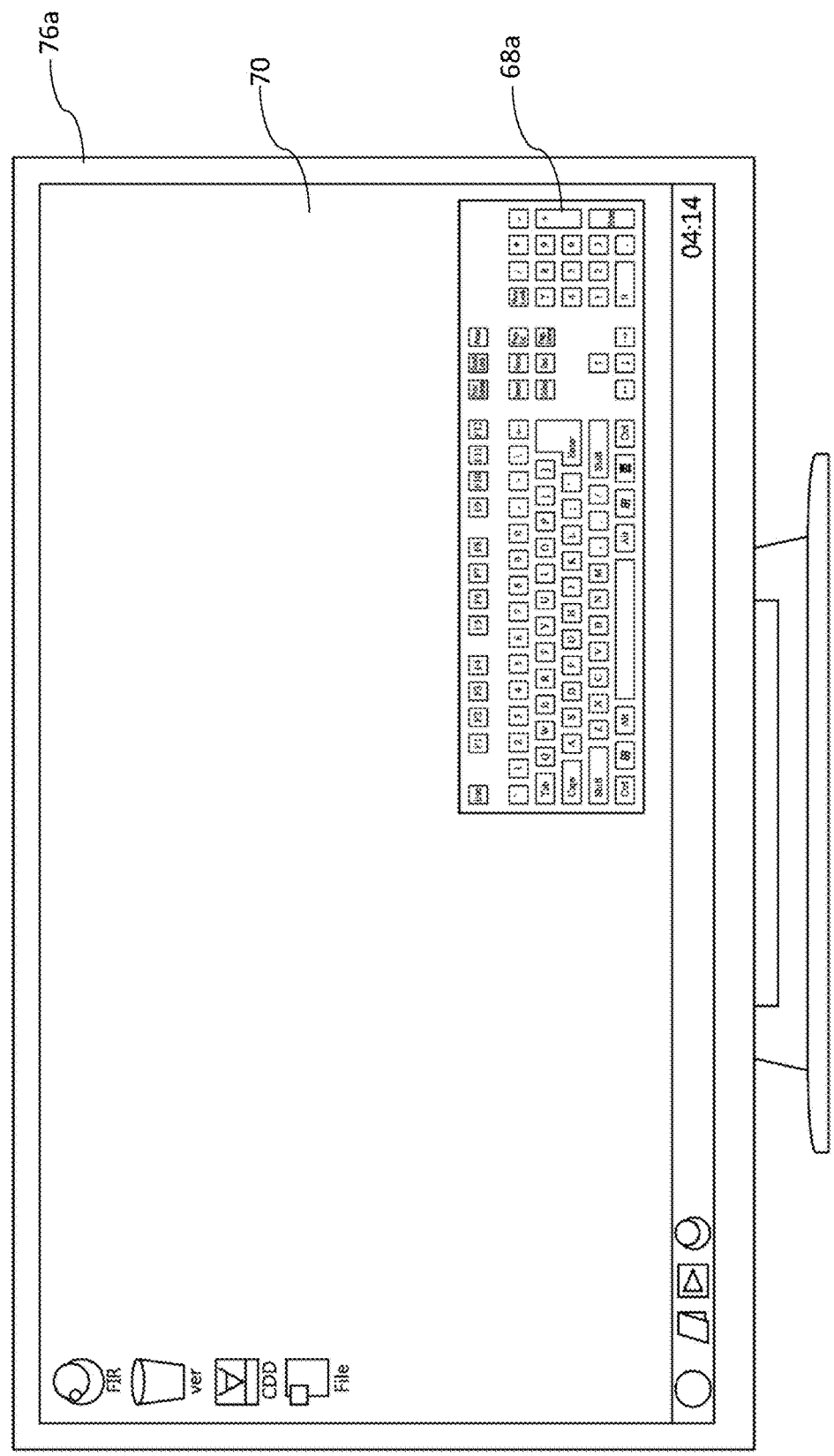
FIG. 8 is a first schematic diagram of an on-screen keyboard according to a seventh embodiment of the present invention.

Referring to FIG. 8 to FIG. 12, FIG. 8 to FIG. 12 are schematic diagrams of an on-screen keyboard 68a according to a seventh embodiment of the present invention. The on-screen keyboard 68a of this embodiment is utilizing the computing device 64b and the physical keyboard 50 in the fifth embodiment for describing. FIG. 8 describes displaying of the on-screen keyboard 68a of this embodiment on a screen 76a which is internally disposed on or externally connected to a computing device 64b. After execution, the on-screen keyboard 68a is located on a topmost layer (that is, a view attribute is set as "Topmost") of an operating system desktop 70, that is, even if windows of other applications are displayed at the same position of the on-screen keyboard 68a, the windows still do not block displaying of the on-screen keyboard 68a. A keyboard layout of the on-screen keyboard 68a is drawn corresponding to a layout of a physical keyboard 50 (shown in FIG. 10), to avoid that the on-screen keyboard 68a is excessively different from real keys in positions, resulting in that the user is not adapted to the on-screen keyboard 68a. The on-screen keyboard 68a is a part of the computer program product.

Figure 9:
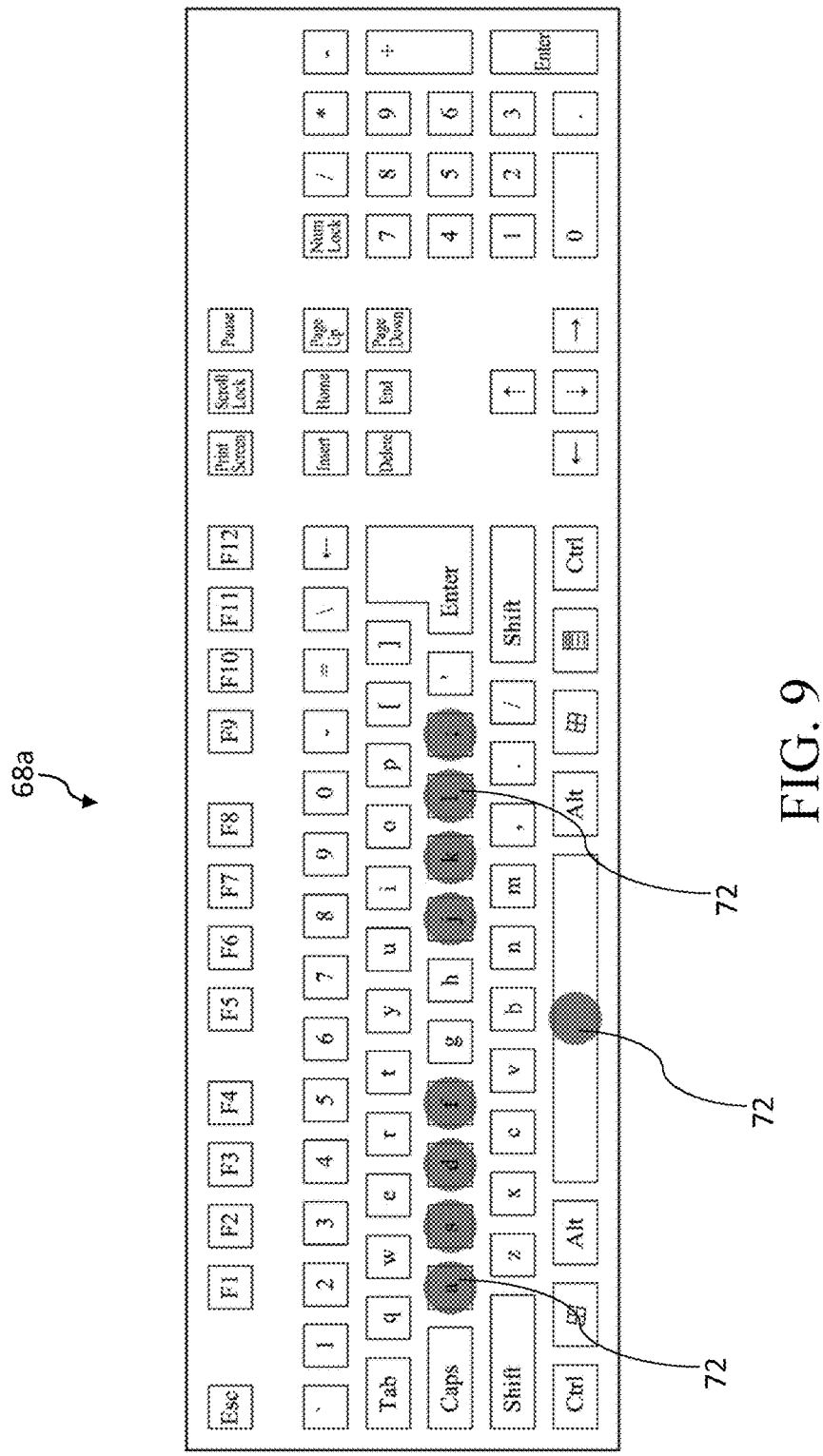
FIG. 9 is a second schematic diagram of an on-screen keyboard according to a seventh embodiment of the present invention.
Figure 10:
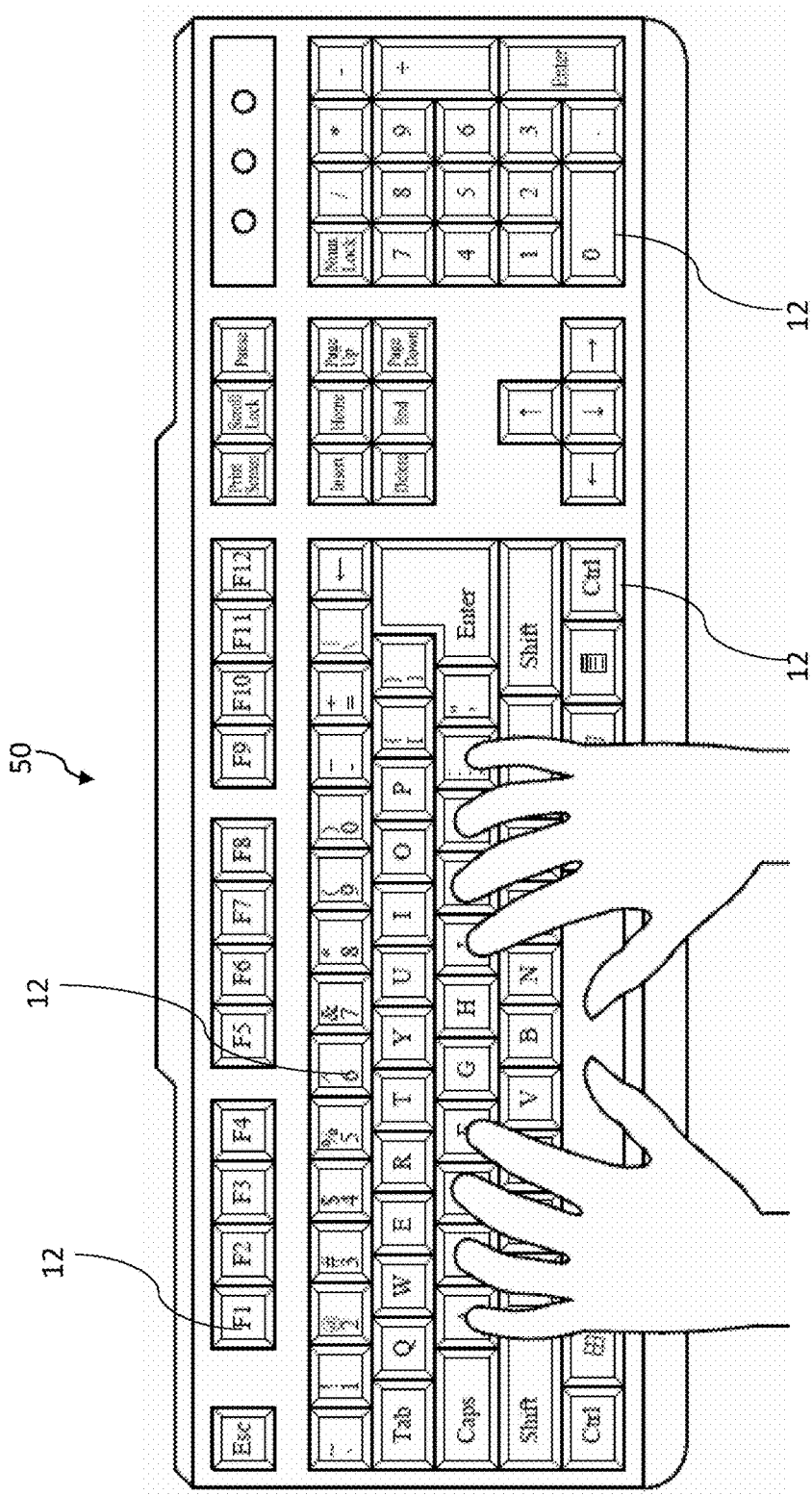
FIG. 10 is a third schematic diagram of an on-screen keyboard according to a seventh embodiment of the present invention.

FIG. 9 is an enlarged schematic diagram of the on-screen keyboard 68a and describes that when fingers of a user are touching the keys 12 of the physical keyboard 50, or "approaching but not touching" (for example, the finger is suspended on the key 12 at a very close distance) the keys 12 of the physical keyboard 50, the fourth sensor 51 is detecting and obtaining an operating position image which is a captured photo image of a finger (or fingers) and keys 12. The operating position image is then analyzed by an image analyzing module 58, so as to be converted into an operating position data, where the operating position data includes relative position data of these keys 12 which are touched or approached, i.e., relative position data of the finger (or fingers) of the user and one of these keys 12. The processor 66 further converts the operating position data into a first key mark 72. The first key mark 72 is displayed at a position on the on-screen keyboard 68a which corresponds to the touched key 12. Herein, the marked positions of the first key marks 72 include a "key A", a "key S", a "key D", a "key F", a "key J", a "key K", a "key L", a "key;" and a "space key". FIG. 10 corresponds to FIG. 9. FIG. 10 describes keys 12 of the "key A", the "key S", the "key D", the "key F", the "key J", the "key K", the "key L", the "key;" and the "space key" on the physical keyboard 50 are being touched or approached by the fingers of the user. When the fingers of the user are touching or approaching the keys 12 but not depressing the keys, in this case, the positions of the fingers are referred to as the "fingers standby positions" or the "fingers ready positions".

Figure 11:
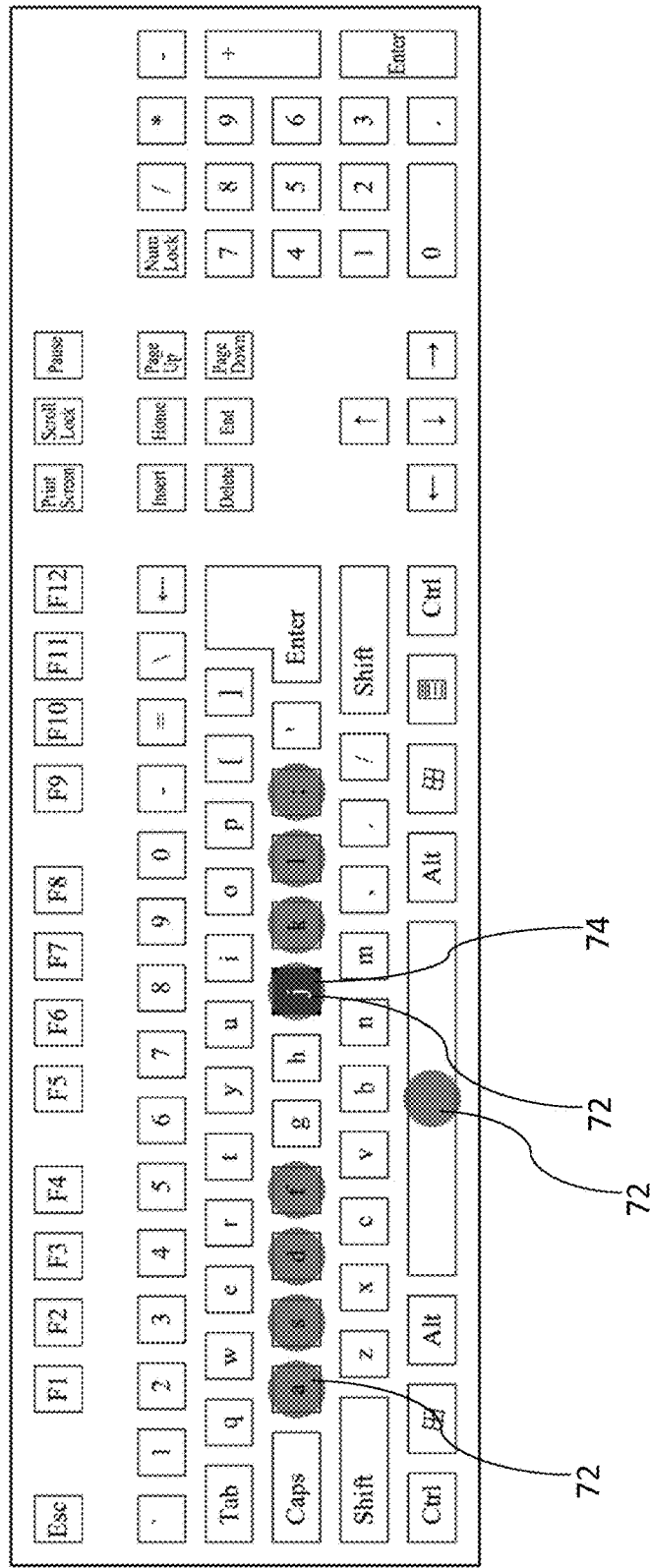
FIG. 11 is a fourth schematic diagram of an on-screen keyboard according to a seventh embodiment of the present invention.

FIG. 11 describes that the "key J" on the on-screen keyboard 68a is marked with both the first key mark 72 and a second key mark 74, that is, when the fingers of the user are touching or approaching the keys 12 of the "key A", the "key S", the "key D", the "key F", the "key J", the "key K", the "key L", the "key;" and the "space key" on the physical keyboard 50, and at the same time the finger of the user is depressing the key 12 of the "key J". In other words, not only the key 12 of the "key J" is touched or approached to generate an operating position data, but is also depressed to generate a key scan code (that is, a "Make Code"). This case occurs when the key 12 of the "key J" is depressed down (the "Make Code" is generated), but the key 12 of the "key J" is not released (the "Break Code" is not yet generated). When typing is performed at a normal speed, the second key mark 74 exists on the on-screen keyboard 68a for a considerably short time (or referred to as a display time) which is usually less than one second or even less than one tenth of a second, and is a flashing to human eyes.

Theoretically, it must be that the fingers touch the keys 12 first and then depress the keys 12. If typing is performed at a relatively fast speed, and the finger does not touch the key 12 until a keystroke, the operating position data and the key scan code (that is, a "Make Code") of the same key are "almost" generated simultaneously (there is still a difference in time between the operating position data and the key scan code, but the difference might be counted in milliseconds). That is, the first key mark 72 and the second key mark 74 of the same key are displayed "almost" simultaneously (human eyes are not easy to perceive a difference in time so as to feel that the first key mark 72 and the second key mark 74 of the same key are simultaneously displayed) on the on-screen keyboard 68a. However, when the majority persons (specifically those who type with two hands in correct fingering) type, before depressing keys (for example, when the persons are considering which word is to be used), the persons are accustomed to placing fingers at the "home keys" (or referred to as a Home Row, that is on the key 12 touched by the fingers shown in FIG. 10), or placing fingers on a will-be-pressed key 12. Then, the key 12 is depressed. That is, sometimes, a first key mark 72 of a key 12 is displayed obviously earlier than a second key mark 74 of the same key on the on-screen keyboard 68a. In addition to that second key marks 74 of a few locking keys (such as a "caps-lock key", a "number-lock key", and a "scroll-lock key" of a locking-key type or an "insert key" of a modifier key type) are separately displayed on the on-screen keyboard 68a and do not coexist with the first key marks 72, as to keystrokes (which generate "Make Code") on other keys, the first key marks 72 must be displayed earlier than the second key marks 74, or both the first key marks 72 and the second key marks 74 are almost simultaneously displayed on the on-screen keyboard 68a, and it is not possible that the second key marks 74 are separately displayed without the first key marks 72. Visually, human eyes can obviously discriminate a difference between two overlapped marks and a single mark (using FIG. 12 as an example). Although the second key mark 74 is only a flashing to the human eyes, the second key mark 74 (shown in the top of FIG. 12) that exists separately is obvious different from two overlapped marks (shown in the bottom of FIG. 12), and specifically when the marks of two different colors are displayed in an overlapped manner, the upper-layer mark with incomplete transparency, will generate a visual effect of a third color. The human eyes can obviously distinguish a difference between the third color and colors of the two marks. Therefore, a principle that "the second key mark 74 cannot be separately displayed" can be used as an inspection mechanism visually. When a second key mark 74 of a key is separately displayed on the on-screen keyboard 68a, it represents "occurrence of an error" (for example, the operating position image taken by the camera is not clear, causing the image analyzing module 58 to misjudge), and a user may be reminded to take a notice. In some embodiments, the on-screen keyboard 68a has an automatically alerting mechanism. When a second key mark 74 of a key 12 is separately displayed on the on-screen keyboard 68a, the processor 66 calculates a difference between an erroneously determined position (where the first key mark 72 incorrectly displayed) and the actual position (where the keystroke occurred). The calculated difference is then passed to the image analyzing module 58 and/or the processor 66 for correcting some parameters of generating the operating position data later on. This can reduce the probability of misjudgment occurs.

Herein the actual position is an individually displayed second key mark 74, that is the second key mark 74 generated when a key 12 on the physical keyboard 50 is depressed. The second key mark 74 is a correct mark because a keystroke of the key 12 is really received. The erroneously determined position refers to an adjacent first key mark 72 which is not displayed, when depressed, in a manner of overlapping the second key mark 74. As stated above, when the obtained data is correct, the first key mark 72 (a position of a key touched or approached by the finger) needs to overlap the second key mark 74 (the depressed key 12). Therefore, when the key 12 is depressed, the first key mark 72 and the second key mark 74 of the key 12 that are overlapped needs to be displayed. When only the second key mark 74 is displayed on the on-screen keyboard 68a, the first key mark 72 may be marked at a wrong position because the operating position data obtained by analysis has an error. At this time, the wrongly marked position of the first key mark 72 is defined as the erroneously determined position.

Because the second key mark 74 is only a flashing, and in some embodiments, only the first key mark 72 is marked on the on-screen keyboard 68a to display a finger standby position without the second key mark 74, the on-screen keyboard 68a directly omits processing of the key scan code, as shown in FIG. 9.

Figure 12:
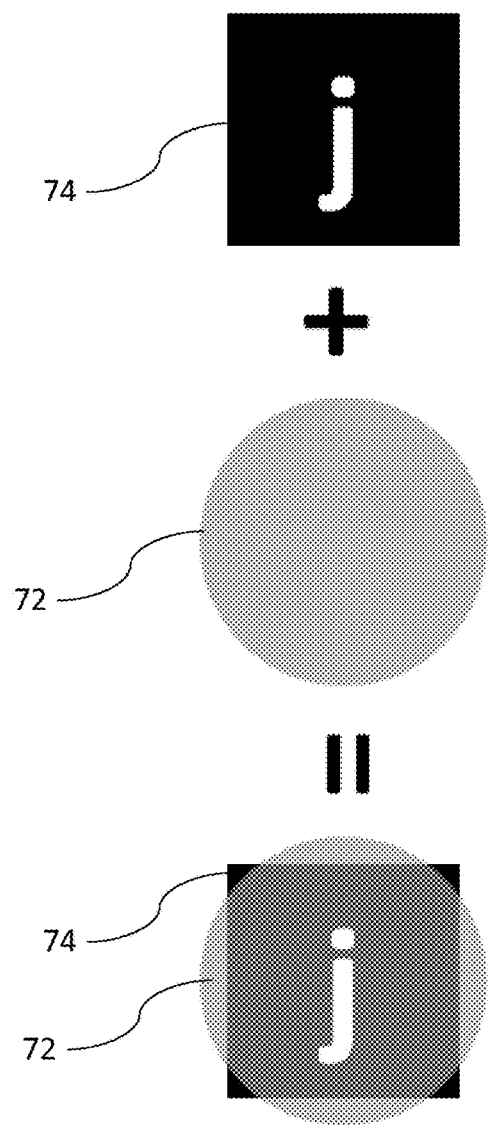
FIG. 12 is a fifth schematic diagram of an on-screen keyboard according to a seventh embodiment of the present invention.

FIG. 12 is an enlarged schematic diagram of the "key J" on the on-screen keyboard 68a shown in FIG. 11 and describes two marks on the "key J". The second key mark 74 in the top is marked in highlighted, and in an aspect, a square, a black background, and white words are used. The first key mark 72 in the middle is marked in a color of semi-transparency and different shapes, and in an aspect, a circle and light grey is used. A figure of overlapped marks in the bottom is an enlarged schematic diagram of the "key J" in FIG. 11. To obviously distinguish the first key mark 72 from the second key mark 74, in some embodiments, the first key mark 72 and the second key mark 74 are marked in different shapes, such as combinations of a circle and a square, a square and a triangle, and a circle and a star. In some embodiments, the first key mark 72 and the second key mark 74 are marked in different colors, such as combinations of yellow and green, red and blue, black and yellow, and light grey and red. In some embodiments, the first key mark 72 and the second key mark 74 are marked in different shapes and different colors. In some embodiments, a mark marked at an upper layer is displayed in a manner of incomplete transparency, so that a mark at a lower layer can be seen. For example, if the first key mark 72 is located at the upper layer, and the second key mark 74 is located at the lower layer, the first key mark 72 is displayed in 50% of transparency. That is, the first key mark 72 or the second key mark 74 located at the upper layer has incomplete transparency. In some embodiments, if the same key 12 is touched (or approached) and depressed, the key 12 may be marked with a third key mark of shapes and colors different from those of the first key mark 72 and the second key mark 74.

Figure 13:
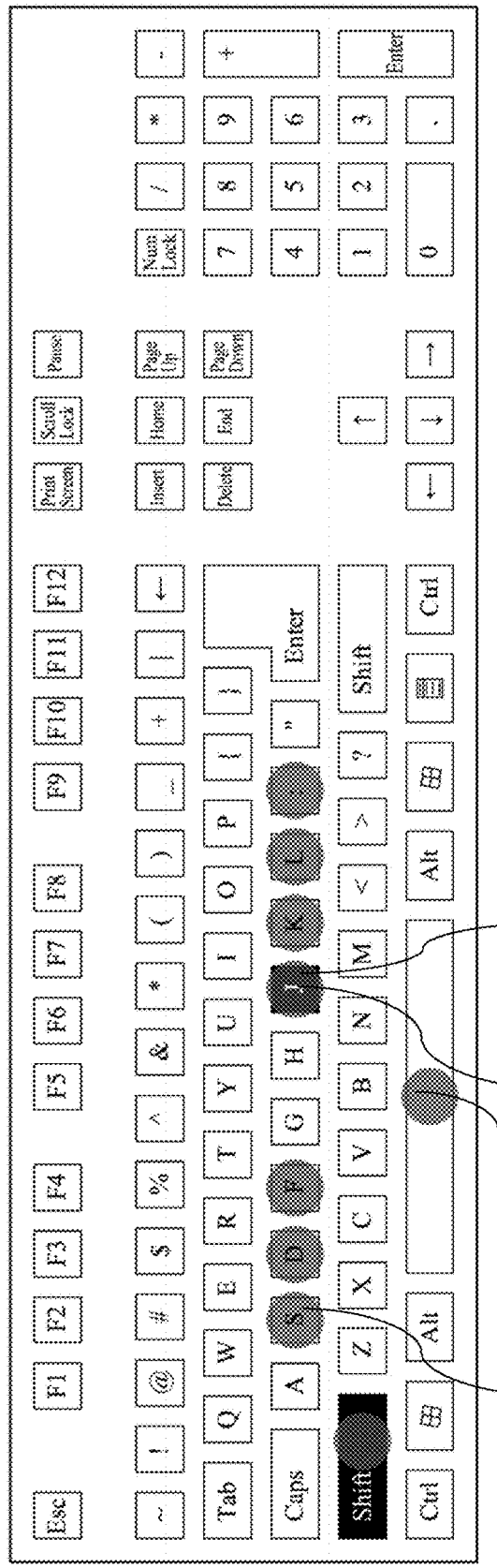
FIG. 13 is a sixth schematic diagram of an on-screen keyboard according to a seventh embodiment of the present invention.

FIG. 13 shows the marks displayed on the on-screen keyboard 68a when the fingers of the user are touching or approaching the keys 12 of the "Shift key", the "key S", the "key D", the "key F", the "key J", the "key K", the "key L", the "key;" and the "space key" on the physical keyboard 50 (generating the operating position image) and are simultaneously depressing keys 12 of the "Shift key" and the "key J" (generating the key scan codes which are "Make Code"). This figure describes that after a key 12 of the "Shift key" is depressed and the key scan code is generated, the key representation characters on the on-screen keyboard 68a also change, that is, the key representation characters change from original lowercase to uppercase, and the key which has two key representation characters (such as numeric keys and symbolic keys) change from the original lower part to the upper part. For example, the "key 1" of the numeric keys has two key representation characters which respectively are the upper part "!" and the lower part "1", and the "key!" of the symbolic keys has two key representation characters which respectively are the upper part "?" and the lower part "/". When the "Shift key" is not depressed, "1" and "/" at the lower part are displayed (shown in FIG. 9), but after the "Shift key" is depressed, "!" and "?" at the upper part are displayed (shown in FIG. 13).

Figure 14:
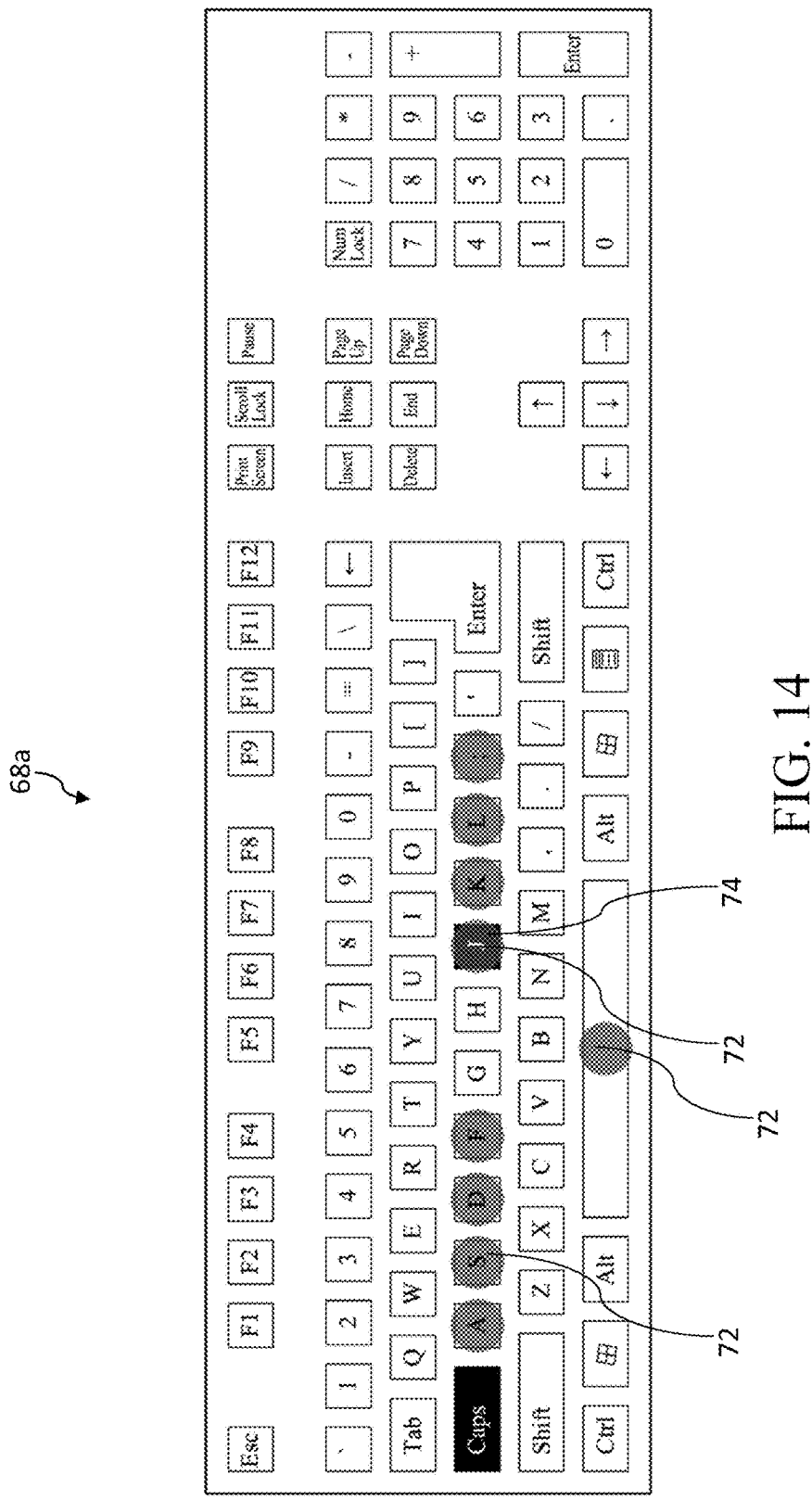
FIG. 14 is a seventh schematic diagram of an on-screen keyboard according to a seventh embodiment of the present invention.

FIG. 14 shows the marks displayed on the on-screen keyboard 68a when the finger of the user has depressed the key 12 of the caps-lock key (generating a key scan code which includes a "Make Code" and a "Break Code", that is, the key 12 is released), and then are touching or approaching the keys 12 of the "key A", the "key S", the "key D", the "key F", the "key J", the "key K", the "key L", the "key;" and the "space key", and is depressing the key 12 of the "key J" (generating a key scan code which is a "Make Code"). The figure describes that after the key 12 of the caps-lock key generates a key scan code, the key representation characters of the letter keys on the on-screen keyboard 68a change from original lowercase letters to uppercase letters.

The two figures above describe that key scan codes of the "Shift key" and the "caps-lock key" may enable the on-screen keyboard 68a to replace a part of key representation characters. Similarly, a "number-lock key" can also enable the on-screen keyboard 68a to replace a part of key representation characters. That is, the on-screen keyboard 68a not only has a function of displaying the first key mark 72 and the second key mark 74, but also includes a function of interacting with the key scan code.

Figure 15:
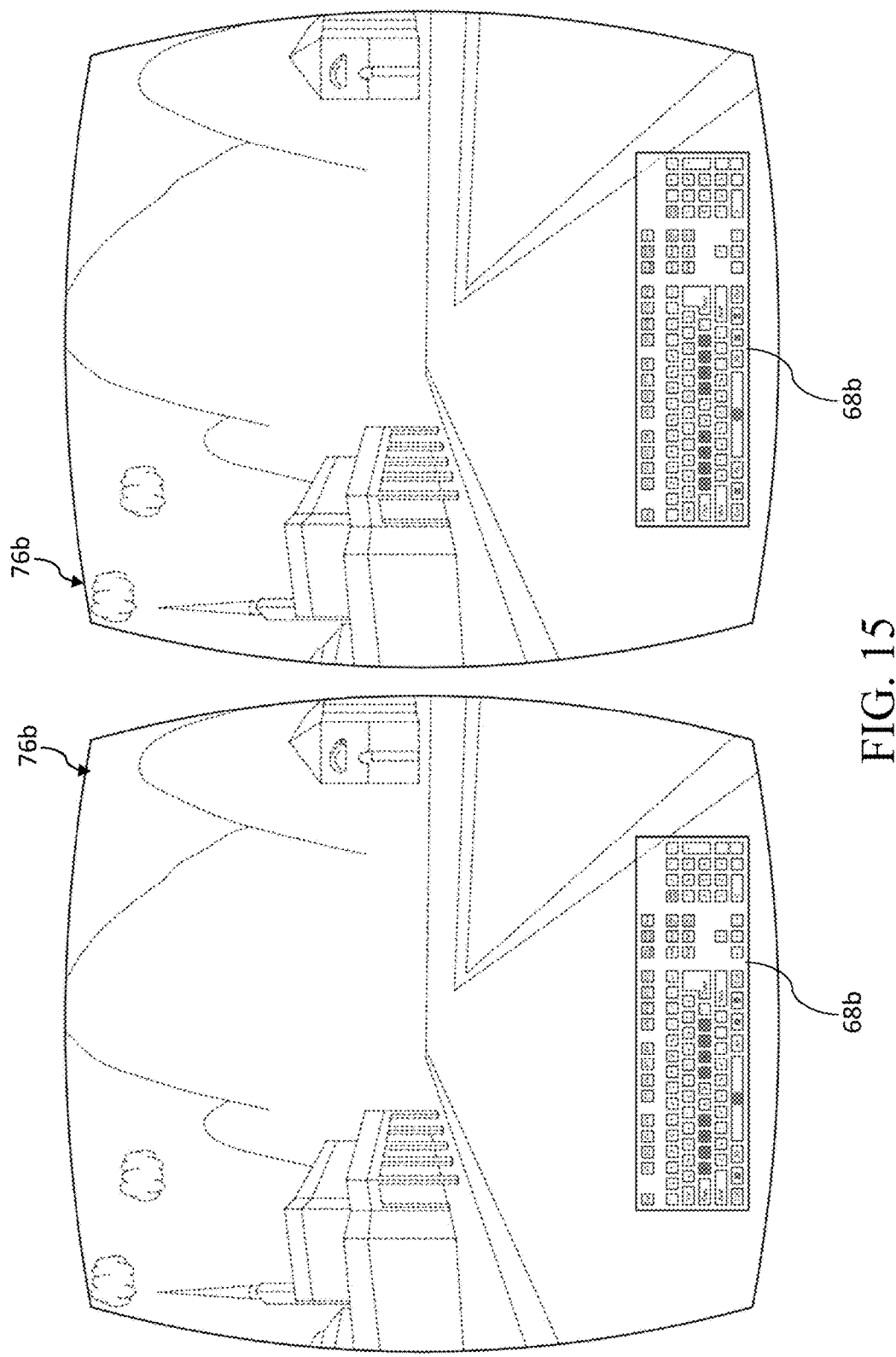
FIG. 15 is a first schematic diagram of an on-screen keyboard according to an eighth embodiment of the present invention.
Figure 16:
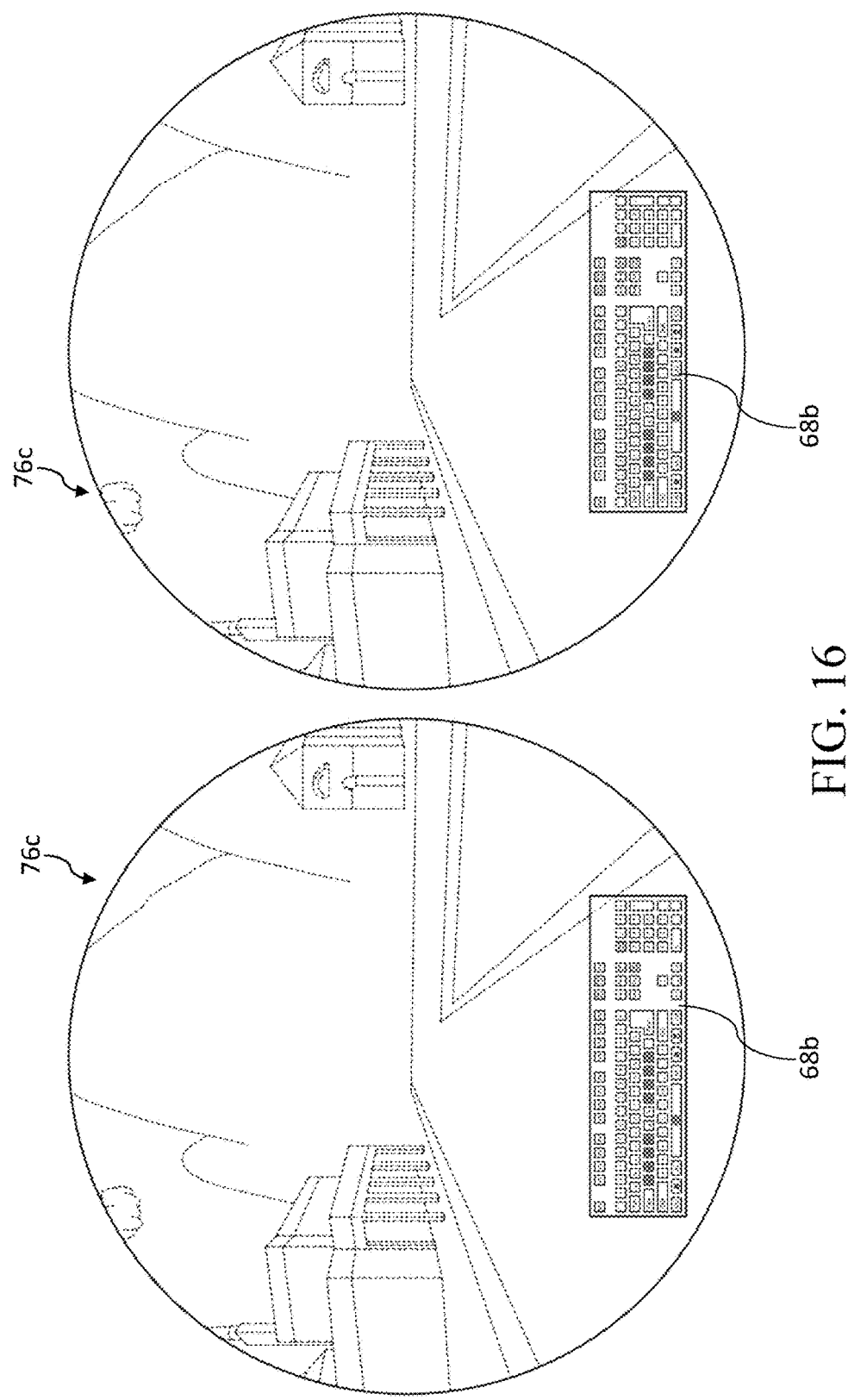
FIG. 16 is a second schematic diagram of an on-screen keyboard according to an eighth embodiment of the present invention.
Figure 17:
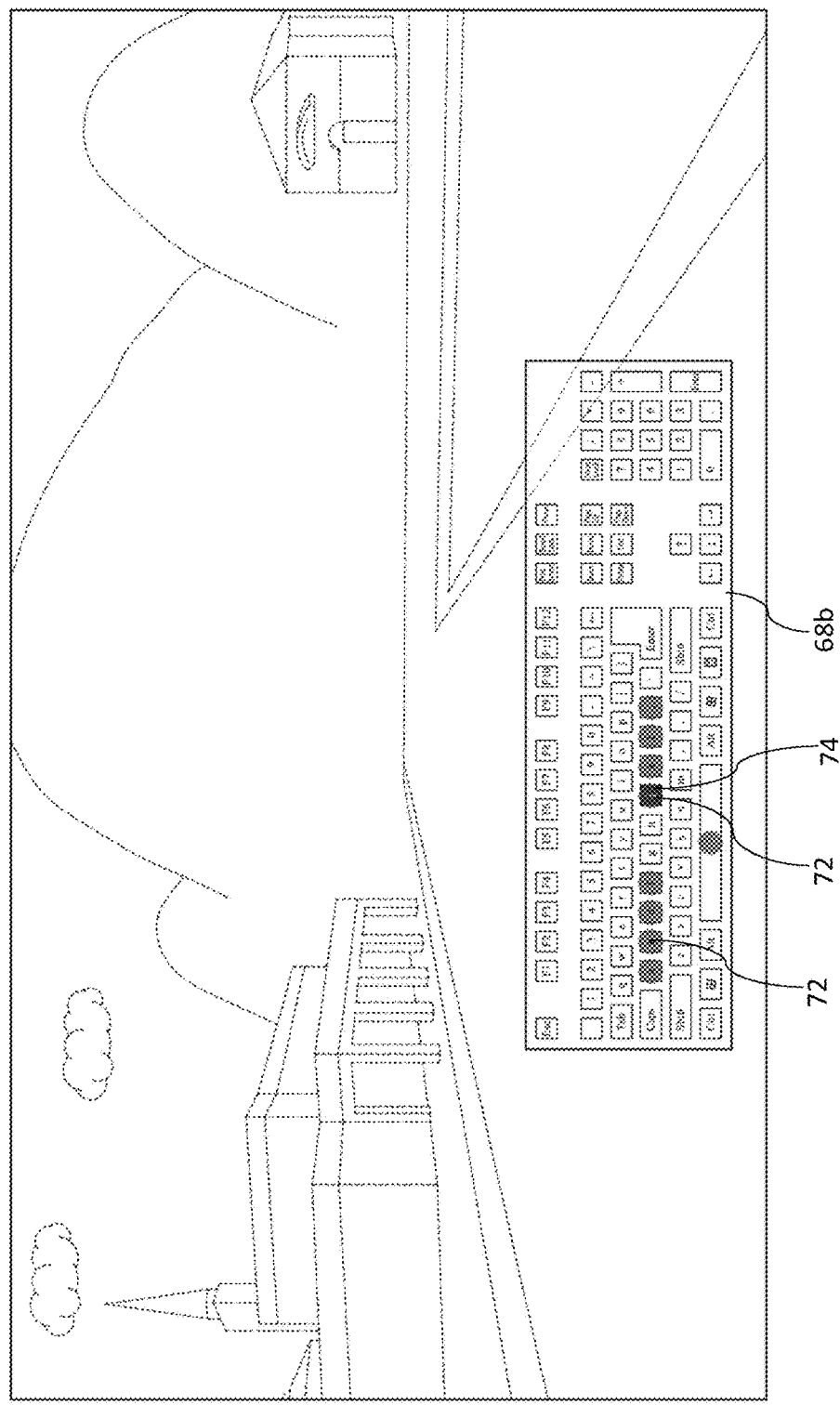
FIG. 17 is a third schematic diagram of an on-screen keyboard according to an eighth embodiment of the present invention.

Referring to FIG. 15 to FIG. 17, FIG. 15 to FIG. 17 are schematic diagrams of an on-screen keyboard 68b according to an eighth embodiment of the present invention. Display screens in this embodiment are screens 76b and 76c of a virtual reality display device, and the screens 76b and 76c are double-barrel-shaped (shown in FIG. 15) or double-circle-shaped (shown in FIG. 16). After a user puts the virtual reality display device on his head, his eyes see an image shown in FIG. 17. In some embodiments, the virtual reality display device is a computing device 64b having the screen 76b and 76c on itself. For example, a Gear VR of Samsung uses a smartphone as a computing device 64b, and when the present invention is implemented, an on-screen keyboard 68b and a keyboard driver 56 are installed on the smartphone. In some embodiments, the virtual reality display device provides display images of the screens 76b and 76c and additionally needs to be in communication connection with a computing device 64b for installing software thereon and providing hardware computing resources. For example, HTC Vive uses a personal computer as the computing device 64b, and when the present invention is implemented, an on-screen keyboard 68b and a keyboard driver 56 are installed on the personal computer. In some embodiments, a keyboard layout is displayed in an effect of non-transparency on screens 76a, 76b, and 76c. In some embodiments, a keyboard layout is displayed in an effect of incomplete transparency (translucent) on screens 76a, 76b, and 76c. In some embodiments, a user may set transparency of a keyboard layout by himself/herself. Herein, the on-screen keyboard 68b displays a keyboard layout in a manner of incomplete transparency, so that when the user uses the on-screen keyboard 68b, the user still sees a background image (a virtual reality image). If the user is not adept at touch-typing, when the user cannot stare at the physical keyboard 50 (for example, the user is mounted with a virtual reality display device on his head), the user can clearly know a current finger standby position (by means of the first key mark 72), and which key is depressed (by means of the second key mark 74) by using the on-screen keyboard 68b, facilitating typing of data for the user.

Figure 18:
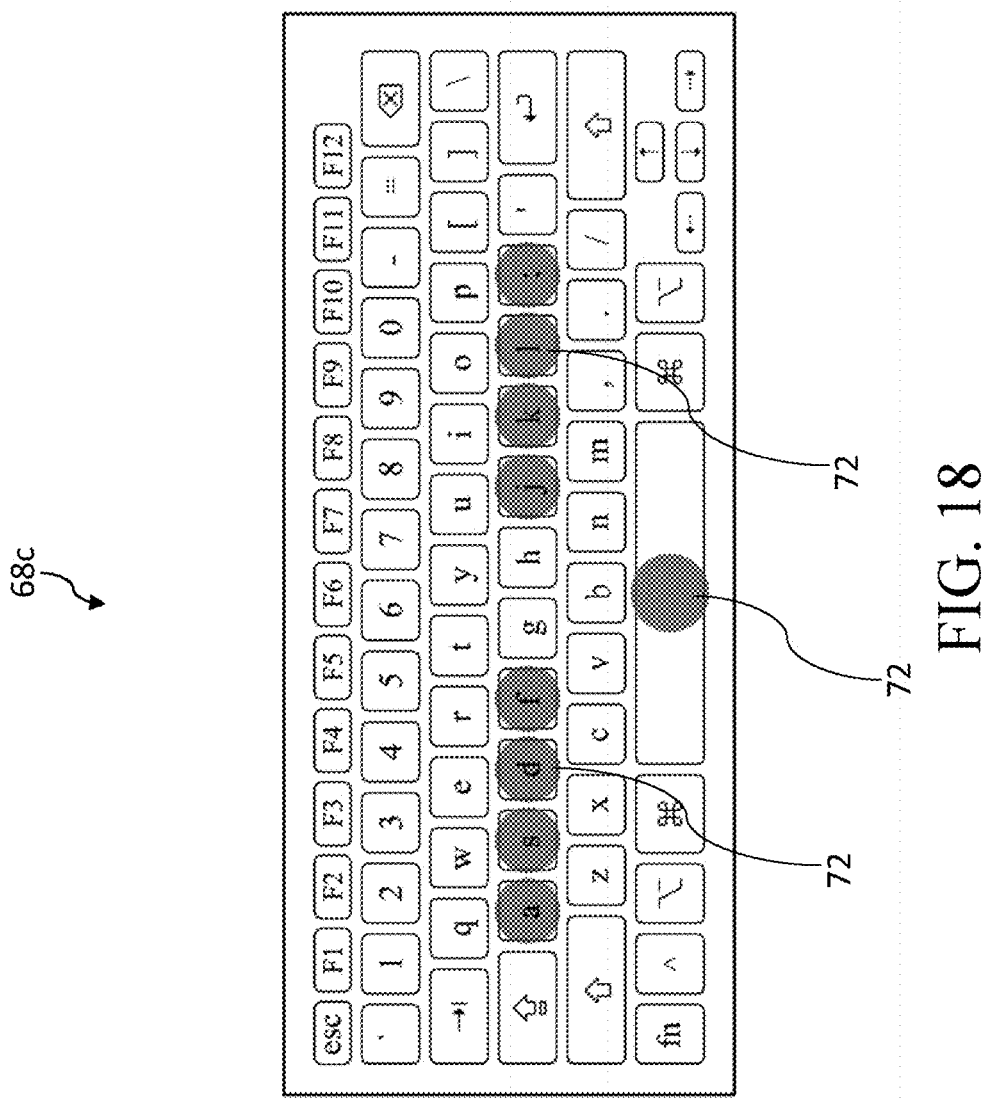
FIG. 18 is a schematic diagram of an on-screen keyboard according to a ninth embodiment of the present invention.

Referring to FIG. 18, FIG. 18 is a schematic diagram of an on-screen keyboard 68c according to a ninth embodiment of the present invention. Differences between the figure and the seventh embodiment and the eighth embodiment lie in that the figure is a keyboard layout corresponding to a physical keyboard of a Mac (not shown). Methods for displaying the first key mark 72 and the second key mark 74 and interacting with the key scan code by the on-screen keyboard 68c in this embodiment to replace a part of key representation characters are the same as those in the above-described embodiments, and details are not repeatedly described.

Figure 19:
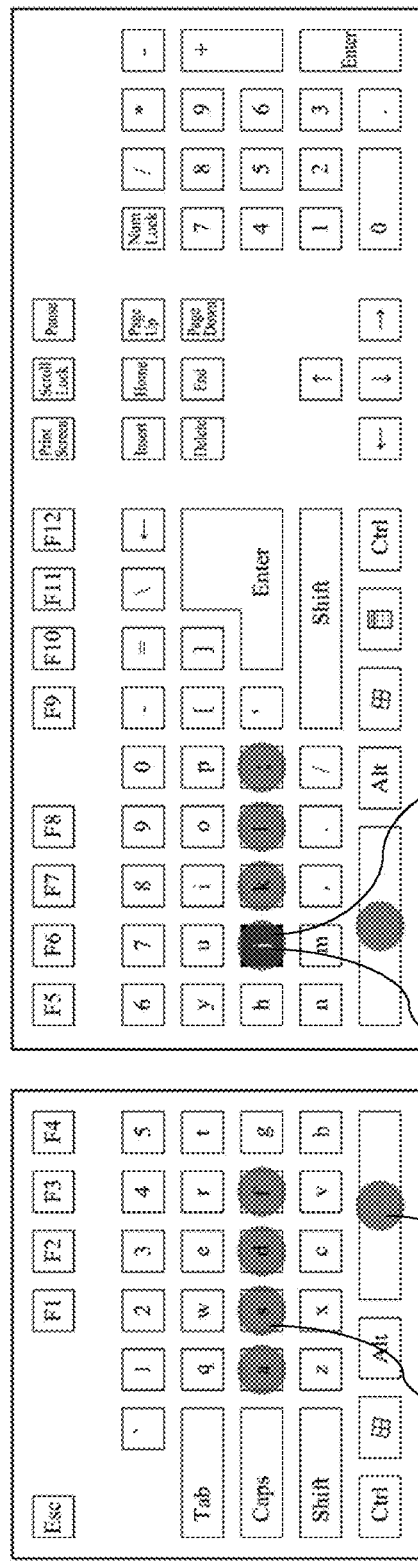
FIG. 19 is a schematic diagram of an on-screen keyboard according to a tenth embodiment of the present invention.

Referring to FIG. 19, FIG. 19 is a schematic diagram of an on-screen keyboard 68d according to a tenth embodiment of the present invention. A difference between this embodiment and the seventh embodiment lies in that a keyboard layout of the on-screen keyboard 68d is divided into two parts, a left part and a right part. That is, this embodiment corresponds to a physical keyboard (not shown) separated in a left and a right part. Marks of a first key mark 72 and a second key mark 74 of this embodiment are the same as those of the above-described embodiments, and details are not repeatedly described. Herein, a corresponding physical keyboard has 105 keys (that is, 104 standard keys of Windows and a duplicate space key). In some embodiments, a keyboard layout of the physical keyboard is "80% scheme" (that is, rightmost numeric keys are omitted) and has 88 keys, and a keyboard layout of the on-screen keyboard separated with the left and right part (not shown) corresponding to the physical keyboard is also "80% scheme". In some other embodiments, a keyboard layout of the physical keyboard may be a keyboard separated by a left and a right part and is "75% scheme" or "80% scheme", or may be a keyboard separated by a left and a right part of a Mac. A corresponding on-screen keyboard uses the same keyboard layout as that of the physical keyboard.

Figure 20:
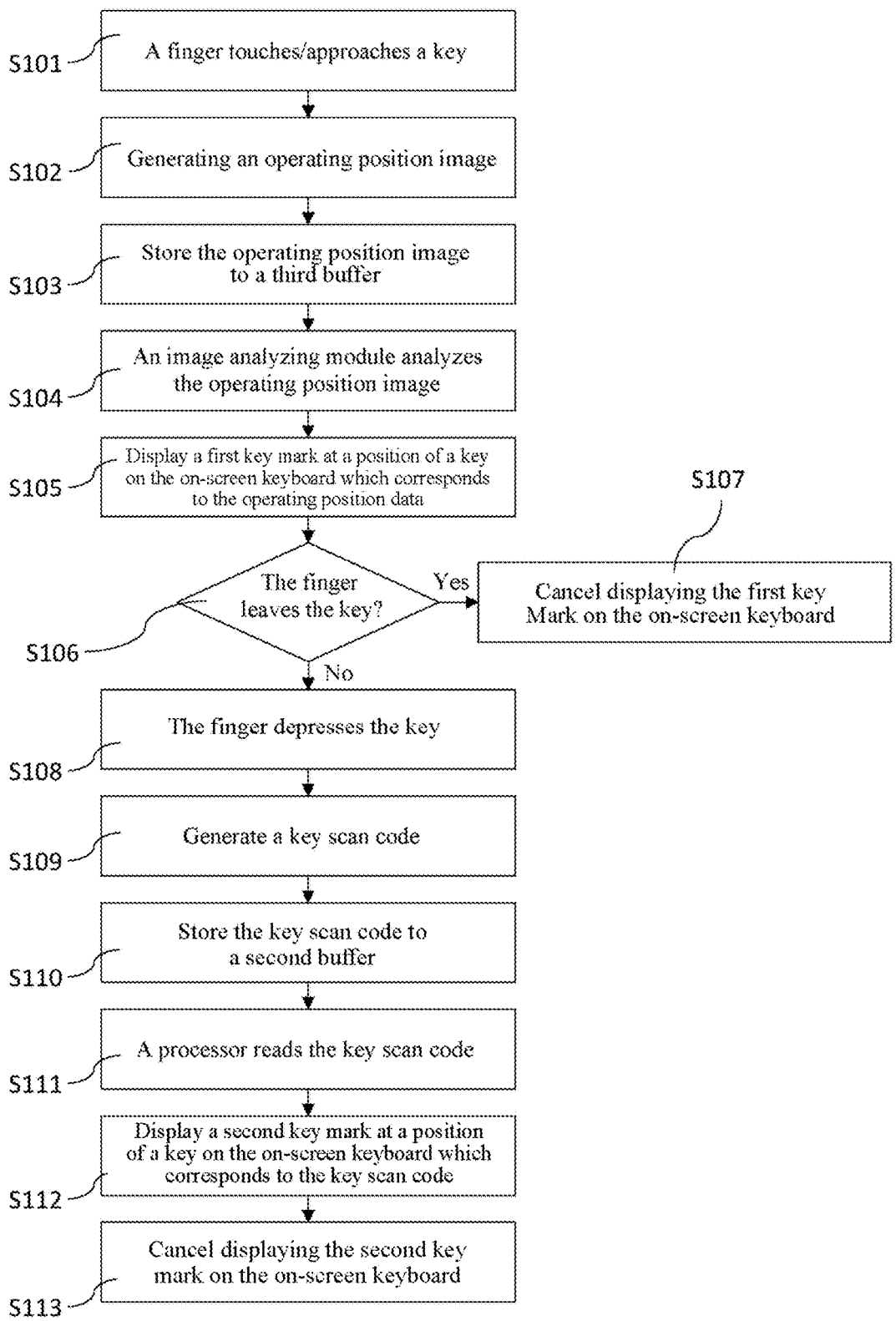
FIG. 20 is an operation flowchart of an on-screen keyboard according to an embodiment of the present invention.

Refer to FIG. 20. FIG. 20 is a flowchart of marking, during a user operation process, the first key mark 72 and the second key mark 74 in the on-screen keyboard 68a according to an embodiment of the present invention; and describes a operating procedure of generating the operating position image and key scan code by using the computing device 64b and the physical keyboard 50 of the fifth embodiment, and generating the corresponding first key mark 72 and second key mark 74 on the on-screen keyboard 68a, including:

Step S101: Touch or approach, by the finger, a key. The finger of the user touches or approaches the key 12 of the physical keyboard 50, but does not depress the key, as shown in FIG. 10. The keys 12 touched (or approached) herein are a "key A", a "key S", a "key D", a "key F", a "key J", a "key K", a "key L", a "key", and a "space key".

Step S102: Generate the operating position image. When the finger touches or approaches the key 12 of the physical keyboard 50 in the former step, a fourth sensor 51 detects and obtains the operating position image, where the operating position image is an photo image of the finger (or fingers) and the key 12 on the physical keyboard 50.

Step S103: Store the operating position image to a third buffer 63. When the fourth sensor 51 generates the operating position image in the former step, the processor 66 stores the operating position image to the third buffer 63.

Step S104: Analyze, by an image analyzing module 58, the operating position image. After the operating position image is stored to the third buffer 63 in the former step, there are two embodiments for the processor 66 to read the operating position image from the third buffer 63. One embodiment is that the fourth sensor 51 sends an interrupt request to the processor 66 of the computing device 64b, and then the processor 66 of the computing device 64b responds to the interrupt request to read the operating position image from the third buffer 63; the other embodiment is that the processor 66 of the computing device 64b automatically reads the operating position image from the third buffer 63 at intervals in a polling manner. That is, an action of reading the operating position image may be triggered in an interruption or a polling manner. After the processor 66 reads the operating position image, an image analyzing module 58 analyzes the operating position image, so as to convert the operating position image into an operating position data, where the operating position data includes the relative position data of these keys 12 which are touched or approached, i.e., relative position data of the finger (or fingers) of the user and these keys 12.

Step S105: Display the first key mark 72 at a position of a key on the on-screen keyboard 68a which corresponds to the operating position data. After the image analyzing module 58 converts the operating position image into the operating position data in the former step, the processor 66 further converts the operating position data into the first key mark 72. That is, the first key mark 72 is displayed at a position on the on-screen keyboard 68a which corresponds to the touched (or approached) key 12. Herein, positions of the corresponding operating position image are: a "key a", a "key s", a "key d", a "key f", a "key j", a "key k", a key l", a "key;", and a "space key", as shown in FIG. 9. The on-screen keyboard 68a is displayed at a topmost layer of the displayed image (i.e., a view property is set as "Topmost"). Generally, the on-screen keyboard 68a is displayed after the operating position data or the key scan code is read, but may disappear after an idle timeout after being displayed. Therefore, in some cases, although the operating position data or the key scan code is not read, the on-screen keyboard 68a is still in a display state and disappears after the idle timeout (if the operating position data or the key scan code is not read during the period). In some embodiments, the on-screen keyboard 68a may also be displayed when an application program is executed, keeps in the display state, and disappears until the user ends the application program. In some embodiments, the on-screen keyboard 68a is not immediately displayed when the application program is executed, and displaying and disappearance thereof are controlled by the user.

Step S106: Determine whether the finger leaves the key. The image analyzing module 58 may determine whether the finger leaves the touched key 12 according to the operating position data. That is, in the analyzed operating position data, if only the key rather than the relative position data of the finger and the key is included, it indicates that the finger leaves the original touched key 12. If a finger leaves the touched key 12 (i.e., the corresponding key 12 of the generated first key mark 72 in the former step), step S107 is performed; and if the finger still does not leave the touched (or approached) key 12, step S108 is performed.

Step S107: Cancel displaying the first key mark 72 on the on-screen keyboard 68a. When the image analyzing module 58 determines that a finger leaves "the corresponding key 12 of the generated first key mark 72", the on-screen keyboard 68a cancels displaying the corresponding first key mark 72.

Step S108: Depress, by the finger, the key. When the finger depresses the key 12, a key contact of the depressed key 12 changes from a normally open state into a conductive state because of the keystroke.

Step S109: Generate the key scan code. When the keystroke determining unit 162 detects that a key contact of a key 12 changes from a normally open state into a conductive state, the key scan code (a key scan code of the depressed key 12) is generated. Herein, using the "key J" being depressed as an example, the keystroke determining unit 162 generates a key scan code (being a Make Code) of the "key J".

Step S110: Store the key scan code to the second buffer 62. After the keystroke determining unit 162 generates the key scan code (Make Code) in the former step, the micro control unit 161 sends out the key scan code to the computing device 64b, and the computing device 64b stores the key scan code (Make Code) of the "key J" to the second buffer 62 of the computing device 64b by using a keyboard driver 56.

Step S111: Read, by the processor 66, the key scan code. After the micro control unit 161 stores the key scan code (Make Code) to the second buffer 62 in the former step, there are two embodiments for the processor 66 to read the key scan code from the second buffer 62. One embodiment is that the micro control unit 161 sends an interrupt request to the processor 66 of the computing device 64b, and then the processor 66 of the computing device 64b responds to the interrupt request to read the key scan code from the second buffer 62; the other embodiment is that the processor 66 of the computing device 64b automatically reads the key scan code from the second buffer 62 at intervals in a polling manner That is, an action of reading the key scan code may be triggered in an interruption or a polling manner.

Step S112: Display the second key mark 74 at a position of a key on the on-screen keyboard 68a which corresponds to the key scan code. After the processor 66 reads the key scan code (Make Code) in the former step, the processor 66 displays, according to the key scan code, the second key mark 74 on the on-screen keyboard 68a at a position of a key corresponding to the depressed key 12. Herein, the position corresponding to the key scan code is the "key j". The displayed second key mark 74 and the previously displayed first key mark 72 are shown in FIG. 11.

Step S113: Cancel displaying the corresponding second key mark 74 on the on-screen keyboard 68a. When the keystroke determining unit 162 detects that the key contact of the pressed key 12 changes from a conductive state into a normally open state, the key scan code (a key scan code of a released key 12) is generated. Herein, using the "key J" being released as an example, the keystroke determining unit 162 generates a key scan code (being a Break Code) of the "key J". After the key 12 is released, the computing device 64b stores the key scan code (Break Code) of the "key J" to the second buffer 62 by using the keyboard driver 56. Subsequently, the processor 66 reads the key scan code (Break Code) of the "key J". Finally, the according to the key scan code (Break Code) of the "key J", displaying the corresponding second key mark 74 on the on-screen keyboard 68a is cancelled, as shown in FIG. 9 (supposing that the finger of the user still touches or approaches the key 12 of the "key J" after the "key J" is released). Particularly, the processor 66 may additional determine that the depressed key is a general key such as a letter or a digit, or is a locking-key type such as the "Shift key" stated above. If the key scan code of the corresponding released key 12 is received and the key 12 is not a locking-key type, displaying the corresponding second key mark 74 is cancelled. On the contrary, if the key scan code of the corresponding released key 12 is received and the key 12 is a locking-key type, displaying the corresponding second key mark 74 is maintained. Displaying the corresponding second key mark 74 is cancelled until the same second key mark 74 of the same key 12 which corresponds to the keystroke is received at a next time.

The foregoing is a method for marking the first key mark 72 and the second key mark 74 on the on-screen keyboard 68a according to an embodiment of the present invention. The present invention further, in some embodiments, after step S107, supposes that the finger of the user completely leaves all keys 12 for an idle timeout, i.e., the processor 66 of the computing device 64b does not detect (i.e., read), before the idle timeout, the operating position data including relative data of the finger of the user and these keys 12 and the key scan code, the on-screen keyboard 68a is automatically hidden (not displayed on a screen 76a). On the contrary, if the original on-screen keyboard 68a is not displayed on the screen 76a, the on-screen keyboard 68a is automatically displayed on a screen 76a after the finger of the user touches any key 12. This embodiment is intended to hide the on-screen keyboard 68a when the user needs not to operate/type data using a keyboard, so as to avoid taking up an operating system desktop 70, thereby enabling the user to operate other application programs by using control operation devices, for example, operating a web page browser with a mouse or a trackball to view web page, or playing a computer game with a joystick.

The foregoing method of the on-screen keyboard 68a and the computer program product are described by using the physical keyboard 50 and the computing device 64b of the fifth embodiment as examples, where the fourth sensor 51 detecting and obtaining the operating position image is a camera. When the foregoing method and the computer program product are implemented by using the physical keyboard 10 of the first embodiment or the physical keyboard 20 and the computing device 64a of a second embodiment, the operating position image is detected and obtained by a second sensor 15. When the foregoing method and the computer program product are implemented by using the physical keyboard 30 of a third embodiment or the physical keyboard 40 and the computing device 64a of a fourth embodiment, the operating position image is detected and obtained by a second sensor 36 and a third sensor 37. When the foregoing method and the computer program product are implemented by using the physical keyboard 50 and the computing device 64c of the sixth embodiment, the operating position image is detected and the obtained by a fourth sensor 51.

The computer program product of the present invention may include an on-screen keyboard 68a, a keyboard driver 56, a keyboard library (not shown), and/or a keyboard application programming interface (APIs, not shown). A part of or all of the operation procedures described above, may be encapsulated as the keyboard driver, the library, the application programming interface or a device driver (e.g. a driver of a VR device), so as to be further used by other applications. The computer program product may be stored in a computer readable recording medium, such as a Hard Disk Drive, a Solid State Drive, a CD, a DVD, a USB flash disk, a memory card, or recording media of other specifications, and can be loaded and executed by a computer (that is, the computing device 64b described above).

In various embodiments of the present invention, program instructions executed by a computing device can implement every block in the flowchart, a combination of the blocks in the flowchart, or the steps in every embodiment. The program instructions are provided to a processor so as to be executed by the processor to thereby produce resources required for a machine or coordinated operation of hardware and software; hence, the instructions are executed on the processor to thereby produce elements required for carrying out actions specified by the blocks in the flowchart or technical effects. Different combinations of program instructions also allow simultaneous execution of at least some operating steps specified in the blocks in the flowchart, whereas the technical solutions indicated by the first through fourth program instructions of an application may vary from embodiment to embodiment. Furthermore, it is also practicable that some of the steps are executed on one or more processors, for example, in the case of a computing device of multiple processors or in the case of coordinated operation of a microprocessor in a mobile communication device and a peripheral interface processor. Moreover, in the flowchart, at least one block or a combination of blocks may be performed along with the other block or the other combination of blocks simultaneously or performed in a sequence different from its specified counterpart, without departing from the spirit and scope of the present invention.

Therefore, the blocks in the flowchart of the present invention support a combination of elements required for performing specified actions or technical solutions, a combination of steps required for performing specified actions or technical solutions, and program instruction elements required for performing specified actions or technical solutions. What is also understandable is that the specified actions or technical solutions are effectuated by a combination of blocks in the flowchart as well as each block in the flowchart of the present invention through the coordinated operation of a special-purpose hardware-style system or special-purpose hardware, and program instructions.

In view of the above, the on-screen keyboard of the present invention provides the feedback of keystrokes in real time, provides the feedback of the finger standby position of the user on the physical keyboard in real time, and provides the two types of information at the same time, so that the user who is not good at touch typing may watch the screen rather than looking at the physical keyboard. Meanwhile, the automatic correction mechanism of the present invention resolves an erroneous determination problem of the camera, so as to improve the user experience. When applied to a head-up display, a head-mounted display, or a VR device, the on-screen keyboard of the present invention is more suitable for being integrated with a game image/VR image as compared with a conventional real image, without bringing in a strange feeling that virtual and reality are blended. Further, the on-screen keyboard provides two types of information of the keystroke and the finger standby position clearer than the conventional real image. Moreover, compared with the conventional real image, representation of the on-screen keyboard on the screen is performed with a more appropriate processing of non-completely transparent (translucent) effects, so that an overlapping image below the on-screen keyboard (the game image/VR image) may be represented, so as to improve a problem that the conventional real image completely blocks the overlapping image below.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A display method of an on-screen keyboard, applied to a computing device connected to a physical keyboard, a screen and a sensor, the physical keyboard comprising a plurality of keys, the sensor being configured to detect and obtain an operating position image, and the physical keyboard further responds to a keystroke of the key, so as to output a key scan code to the computing device, wherein the display method of the on-screen keyboard comprises:

displaying an on-screen keyboard at a topmost layer of a displayed image of the screen;

reading the operating position image obtained by the sensor;

converting the operating position image into an operating position data, wherein the operating position data comprises a relative position data of a key which is touched or approached;

according to the operating position data, displaying a first key mark at a position corresponding to the key which is touched or approached on the on-screen keyboard;

reading the key scan code outputted by the physical keyboard and corresponding to the keystroke of the key;

according to the key scan code, displaying a second key mark at a position on the on-screen keyboard which corresponds to the keystroke of the key;

wherein, after displaying the second key mark at the position corresponding to the keystroke of the key on the on-screen keyboard, the display method further comprises:

identifying, according to the key scan code, whether the keystroke of the key is a locking-key type;

determining whether the key scan code corresponding to the key which is released is received; and if the key scan code corresponding to the key which is released is received and the key is not a locking-key type, cancelling displaying of the corresponding second key mark; and further comprising: an automatic correction mechanism which, when the second key mark is individually marked on the on-screen keyboard, calculates a difference between an erroneously determined position and an actual position, and feeds back the difference to the computing device, so as to correct a parameter for generating the operating position data at a next time.

2. The display method according to claim 1, wherein the sensor is a camera.

3. The display method according to claim 1, after displaying the first key mark at the position corresponding to the key which is touched or is approached on the on-screen keyboard, further comprising:

if the operating position data comprising the relative position data of the key which is touched or is approached is not received again within a preset time, canceling displaying of the corresponding first key mark.

4. The display method according to claim 1, further comprising: hiding the on-screen keyboard when the operating position data comprising the relative position data of the key which is touched or is approached and the key scan code are not detected after an idle timeout.

5. The display method according to claim 1, wherein shapes of the first key mark and the second key mark are different, the colors of the first key mark and the second key mark are different, or shapes and colors of the first key mark and the second key mark are different.

6. The display method according to claim 1, wherein the first key mark or the second key mark has incomplete transparency.

7. The display method according to claim 1, wherein the on-screen keyboard has incomplete transparency.

8. A computer program product, comprising a plurality of computer executable instructions stored in a non-transitory computer readable medium, wherein the computer executable instructions are loaded and executed by a computing device connected to a physical keyboard, a screen and a sensor to cause the computing device to implement a display method of an on-screen keyboard, the physical keyboard comprising a plurality of keys, the sensor being configured to detect and obtain an operating position image, and the physical keyboard further responds to a keystroke of the key, so as to output a key scan code to the computing device wherein the display method of the on-screen keyboard comprises:

displaying an on-screen keyboard at a topmost layer of a displayed image of the screen;

reading the operating position image obtained by the sensor;

converting the operating position image into an operating position data, wherein the operating position data comprises a relative position data of a key which is touched or approached;

according to the operating position data, displaying a first key mark at a position corresponding to the key which is touched or approached on the on-screen keyboard;

reading the key scan code outputted by the physical keyboard and corresponding to the keystroke of the key; and according to the key scan code, displaying a second key mark at a position on the on-screen keyboard which corresponds to the keystroke of the key;

wherein, after displaying the second key mark at the position corresponding to the keystroke of the key on the on-screen keyboard, the display method further comprises:

identifying, according to the key scan code, whether the keystroke of the key is a locking-key type;

determining whether the key scan code corresponding to the key which is released is received; and if the key scan code corresponding to the key which is released is received and the key is not a locking-key type, cancelling displaying of the corresponding second key mark; and further comprising: an automatic correction mechanism which, when the second key mark is individually marked on the on-screen keyboard, calculates a difference between an erroneously determined position and an actual position, and feeds back the difference to the computing device, so as to correct a parameter for generating the operating position data at a next time.

9. The computer program product for completing the display method of an on-screen keyboard according to claim 8, wherein the sensor is a camera.

10. The computer program product for completing the display method of an on-screen keyboard according to claim 8, after displaying the first key mark at the position corresponding to the key which is touched or is approached on the on-screen keyboard, further comprising:

if the operating position data comprising the relative position data of the key which is touched or is approached is not received again within a preset time, canceling displaying of the corresponding first key mark.

11. The computer program product for completing the display method of an on-screen keyboard according to claim 8, after displaying the second key mark at the position corresponding to the keystroke of the key on the on-screen keyboard, further comprising:

identifying, according to the key scan code, whether the keystroke of the key is a locking-key type;

determining whether the key scan code corresponding to the key which is released is received; and if the key scan code corresponding to the key which is released is received and the key is not a locking-key type, cancelling displaying of the corresponding second key mark.

12. The computer program product for completing the display method of an on-screen keyboard according to claim 8, further comprising: hiding the on-screen keyboard when the operating position data comprising the relative position data of the key which is touched or is approached and the key scan code are not detected after an idle timeout.

13. The computer program product for completing the display method of an on-screen keyboard according to claim 8, wherein shapes of the first key mark and the second key mark are different, the colors of the first key mark and the second key mark are different, or shapes and colors of the first key mark and the second key mark are different.

14. A non-transitory computer readable storage medium, storing a computer program comprising a plurality of computer executable instructions that, when executed by a computing device connected to a physical keyboard, a screen and a sensor, cause the computing device to implement a display method of an on-screen keyboard, the physical keyboard comprising a plurality of keys, and the sensor being configured to detect and obtain an operating position image, and the physical keyboard further responds to a keystroke of the key, so as to output a key scan code to the computing device, wherein the display method of the on-screen keyboard comprises:

displaying an on-screen keyboard at a topmost layer of a displayed image of the screen;

reading the operating position image obtained by the sensor;

converting the operating position image into an operating position data, wherein the operating position data comprises a relative position data of a key which is touched or approached;

according to the operating position data, displaying a first key mark at a position corresponding to the key which is touched or approached on the on-screen keyboard;

after displaying the first key mark at the position corresponding to the key which is touched or is approached on the on-screen keyboard, if the operating position data comprising the relative position data of the key which is touched or is approached is not received again within a preset time, canceling displaying of the corresponding first key mark; and reading the key scan code outputted by the physical keyboard and corresponding to the keystroke of the key;

according to the key scan code, displaying a second key mark at a position on the on-screen keyboard which corresponds to the keystroke of the key; and after displaying the second key mark at the position corresponding to the keystroke of the key on the on-screen keyboard, further comprising:

identifying, according to the key scan code, whether the keystroke of the key is a locking-key type;

determining whether the key scan code corresponding to the key which is released is received; and if the key scan code corresponding to the key which is released is received and the key is not a locking-key type, cancelling displaying of the corresponding second key mark.

15. The non-transitory computer readable storage medium according to claim 14, wherein shapes of the first key mark and second key mark are different, the colors of the first key mark and the second key mark are different, or shapes and colors of the first key mark and the second key mark are different.

* * * * *